United States Patent
Ando et al.

(10) Patent No.: US 10,298,093 B2
(45) Date of Patent: May 21, 2019

(54) TUBULAR MOTOR, CONTROL METHOD FOR BRUSHLESS MOTOR, AND MOTOR EQUIPPED WITH BRAKE

(71) Applicant: NIDEC SANKYO CORPORATION, Suwa-gun, Nagano (JP)

(72) Inventors: Masaaki Ando, Nagano (JP); Shinichi Yoshikawa, Nagano (JP); Goro Nakamura, Nagano (JP); Hironori Kurosawa, Nagano (JP); Yuu Akuzawa, Nagano (JP); Tadashi Takeda, Nagano (JP); Noburu Ashibe, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/312,300

(22) PCT Filed: Oct. 2, 2015

(86) PCT No.: PCT/JP2015/078005
§ 371 (c)(1),
(2) Date: Nov. 18, 2016

(87) PCT Pub. No.: WO2016/056471
PCT Pub. Date: Apr. 14, 2016

(65) Prior Publication Data
US 2017/0271947 A1    Sep. 21, 2017

(30) Foreign Application Priority Data

Oct. 7, 2014    (JP) .................. 2014-206270
Nov. 26, 2014   (JP) .................. 2014-239173
Dec. 26, 2014   (JP) .................. 2014-263860

(51) Int. Cl.
H02K 7/116    (2006.01)
B65H 18/10    (2006.01)
(Continued)

(52) U.S. Cl.
CPC ............. *H02K 7/116* (2013.01); *B65H 18/10* (2013.01); *F16D 55/36* (2013.01); *F16D 65/18* (2013.01);
(Continued)

(58) Field of Classification Search
CPC .............................. H02K 7/116; H02K 7/1166
(Continued)

(56) References Cited

U.S. PATENT DOCUMENTS 6,437,470 B1 * 8/2002 Hsu ................... B62M 6/65
310/67 A
7,839,035 B2 * 11/2010 Hwaung ............. E06B 9/72
310/75 R
(Continued)

FOREIGN PATENT DOCUMENTS

JP    S5135009 A    3/1976
JP    H0366552 U    6/1991
(Continued)

OTHER PUBLICATIONS

International Search Report corresponding to Application No. PCT/JP2015/078005, dated Dec. 28, 2015, with English translation.

*Primary Examiner* — Gary A Nash
(74) *Attorney, Agent, or Firm* — Cantor Colburn LLP

(57) ABSTRACT

A tubular motor may include a tubular case, a motor unit provided inside the case, and a first planetary gear unit placed inside the case at an output side in the motor shaft direction with respect to the motor unit. On the motor unit, a concave part may be formed in an output side end surface of an output side end plate section that supports a rotor, at (Continued)

an output side of the rotor. On the first planetary gear unit, a planetary carrier may include a supporting plate that overlaps with planetary gears at an counter-output side in order to support the planetary gears from the counter-output side. The first planetary gear unit may be immediately adjacent to the output side end plate section at an output side.

23 Claims, 16 Drawing Sheets

(51) Int. Cl.
    *F16H 1/46*     (2006.01)
    *F16D 55/36*     (2006.01)
    *F16D 65/18*     (2006.01)
    *H02P 3/04*     (2006.01)
    *H02P 3/22*     (2006.01)
    *H02P 6/24*     (2006.01)
    *H02K 7/102*     (2006.01)
    *H02K 11/215*     (2016.01)

(52) U.S. Cl.
    CPC .............. *F16H 1/46* (2013.01); *H02K 7/102* (2013.01); *H02K 11/215* (2016.01); *H02P 3/04* (2013.01); *H02P 3/22* (2013.01); *H02P 6/24* (2013.01); *H02K 7/1163* (2013.01); *H02K 2207/03* (2013.01)

(58) Field of Classification Search
    USPC ............................................... 310/83, 93, 99
    See application file for complete search history.

(56) References Cited

U.S. PATENT DOCUMENTS

| | | | | |
|---|---|---|---|---|
| 2003/0222532 A1* | 12/2003 | Hsu | ....................... | F16H 57/033 310/75 R |
| 2009/0289514 A1* | 11/2009 | Fukuoka | ................. | H02K 7/116 310/83 |
| 2011/0298322 A1* | 12/2011 | Sherwin | .................... | H02K 3/47 310/83 |
| 2012/0032541 A1* | 2/2012 | Chen | ....................... | H02K 7/116 310/83 |
| 2013/0207491 A1* | 8/2013 | Hatfield | ................. | H02K 3/522 310/50 |

FOREIGN PATENT DOCUMENTS

| | | |
|---|---|---|
| JP | 07075365 A | 3/1995 |
| JP | 10225054 A | 8/1998 |
| JP | 2001124162 A | 5/2001 |
| JP | 2001288970 A | 10/2001 |
| JP | 2003164179 A | 6/2003 |
| JP | 2003259679 A | 9/2003 |
| JP | 2003262242 A | 9/2003 |
| JP | 2005057852 A | 3/2005 |
| JP | 2005280919 A | 10/2005 |
| JP | 2007195284 A | 8/2007 |
| JP | 2008271705 A | 11/2008 |
| JP | 2009012569 A | 1/2009 |
| JP | 2009177905 A | 8/2009 |
| JP | 2009257494 A | 11/2009 |
| JP | 2010221964 A | 10/2010 |

* cited by examiner

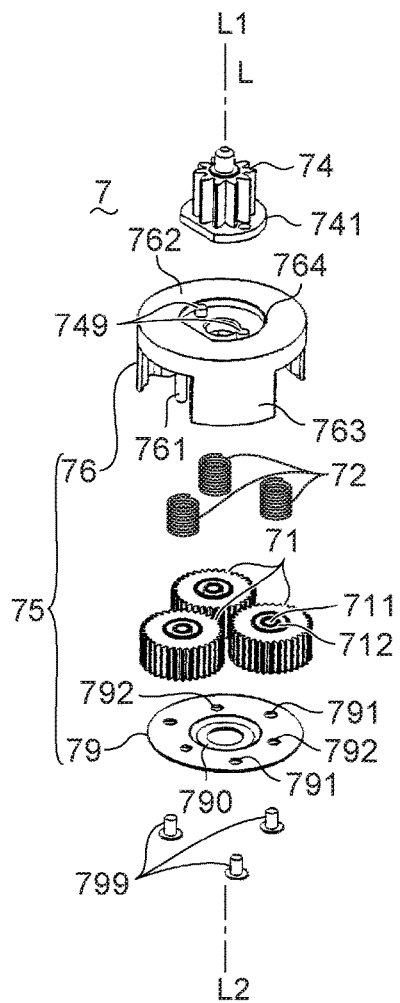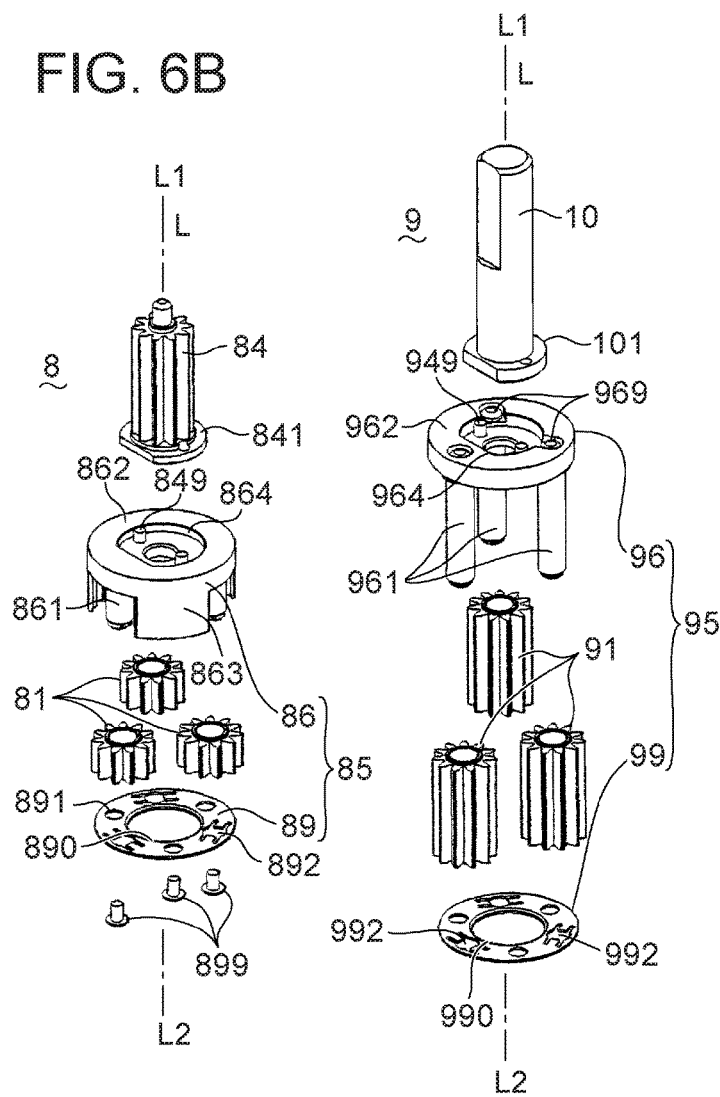
FIG. 6A FIG. 6B FIG. 6C

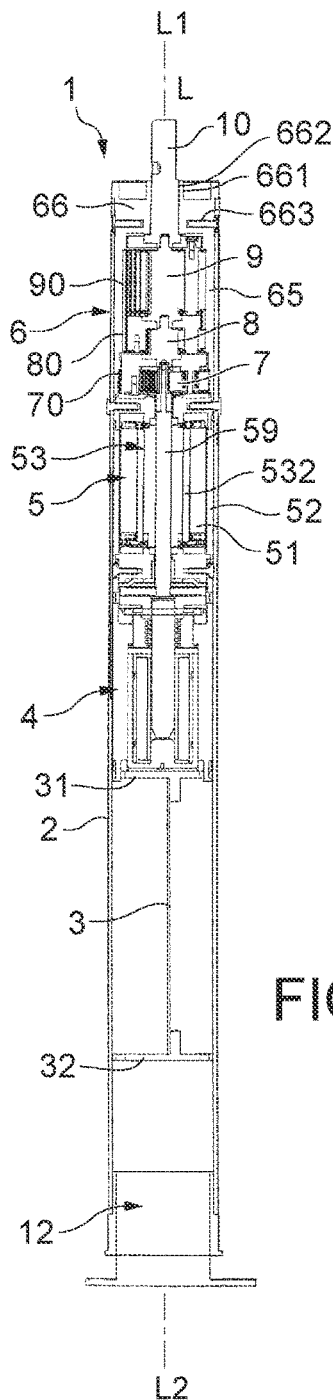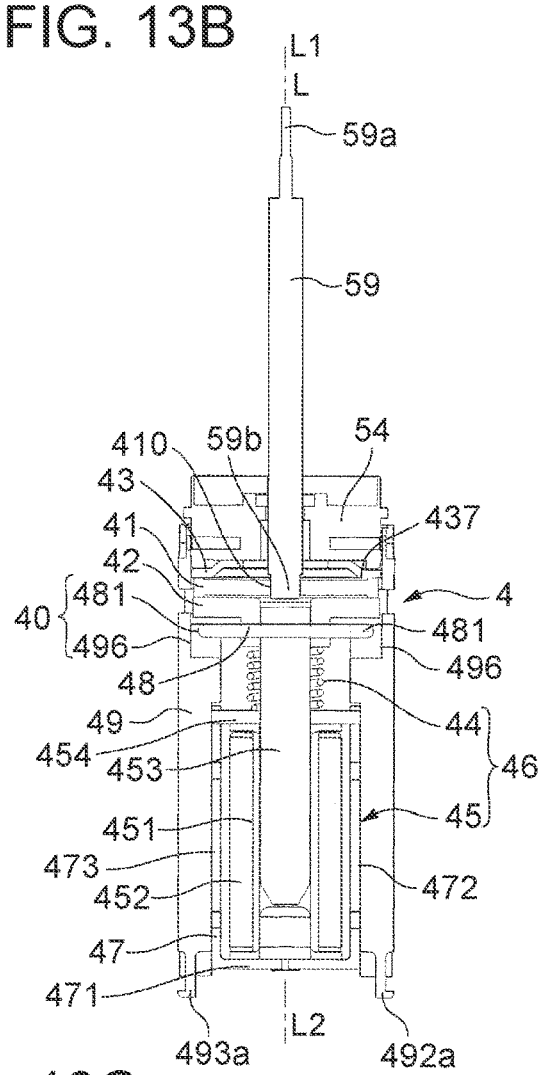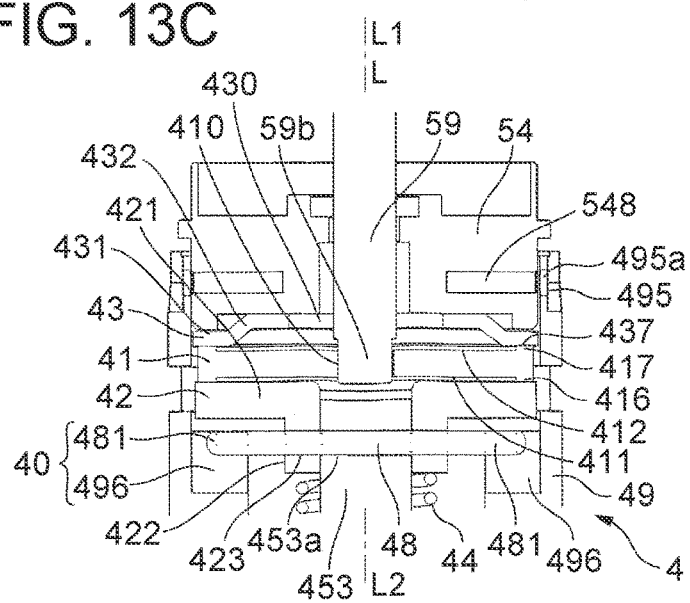

FIG. 15A
FIG. 15B
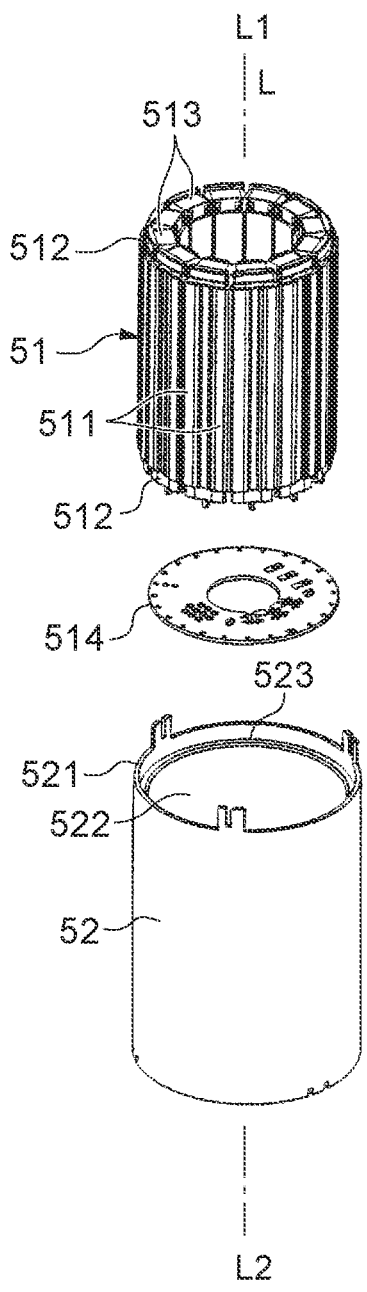
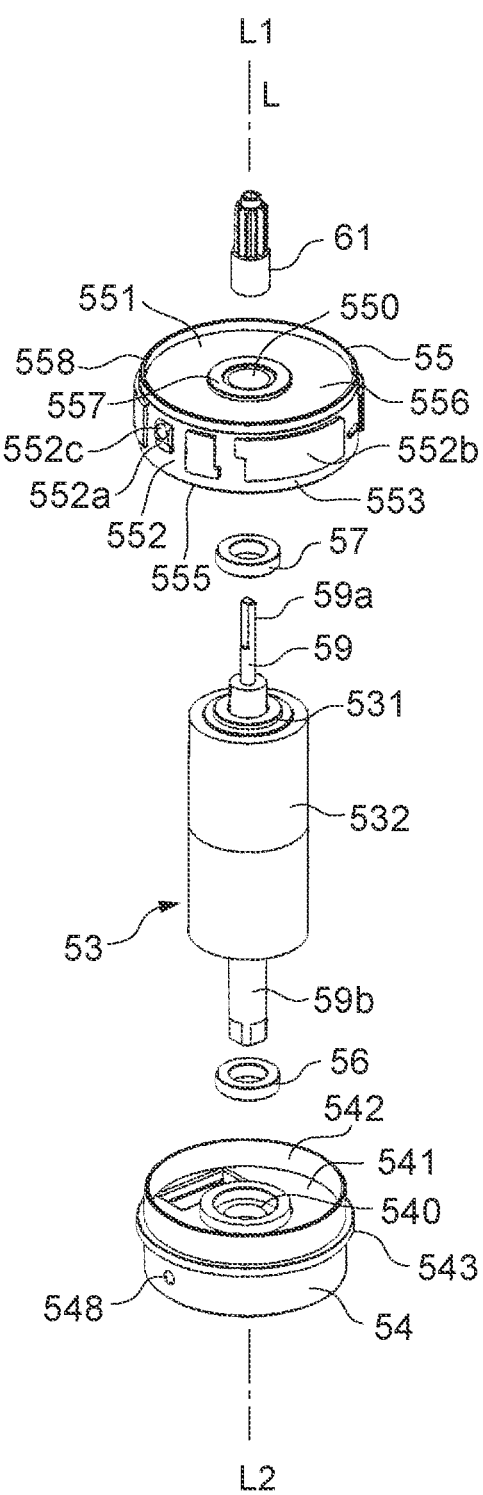

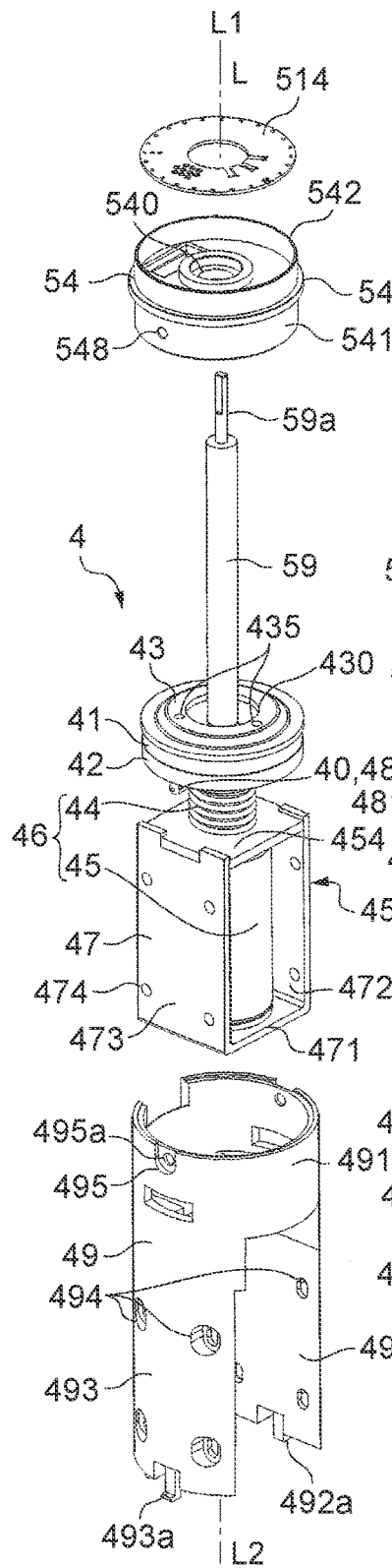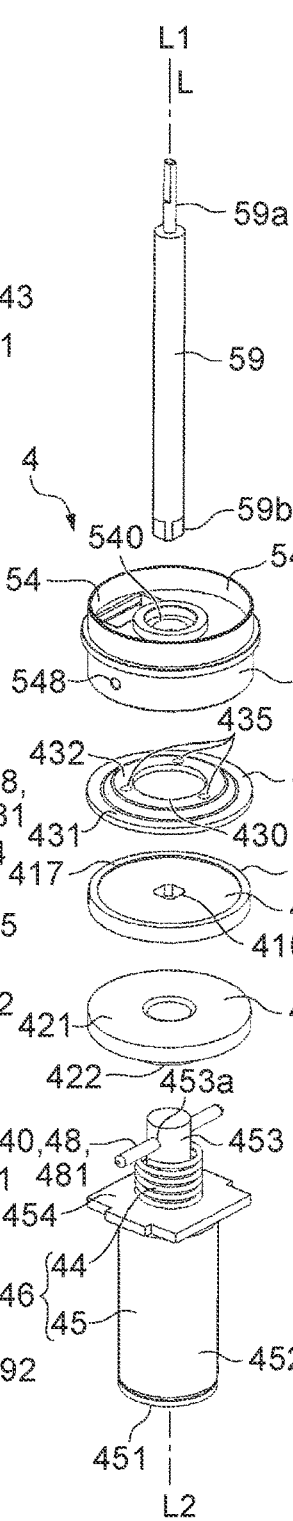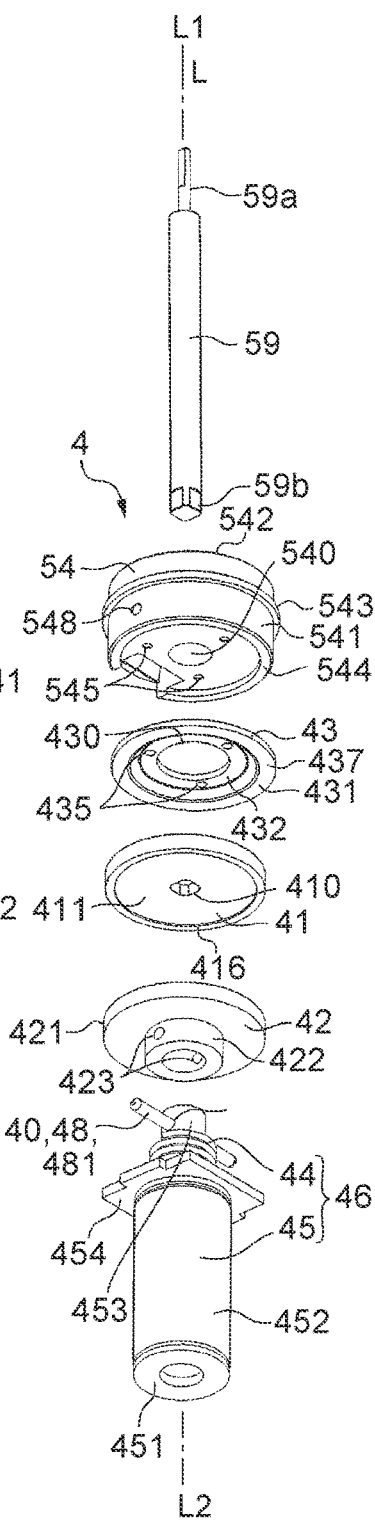

FIG. 17A
FIG. 17B
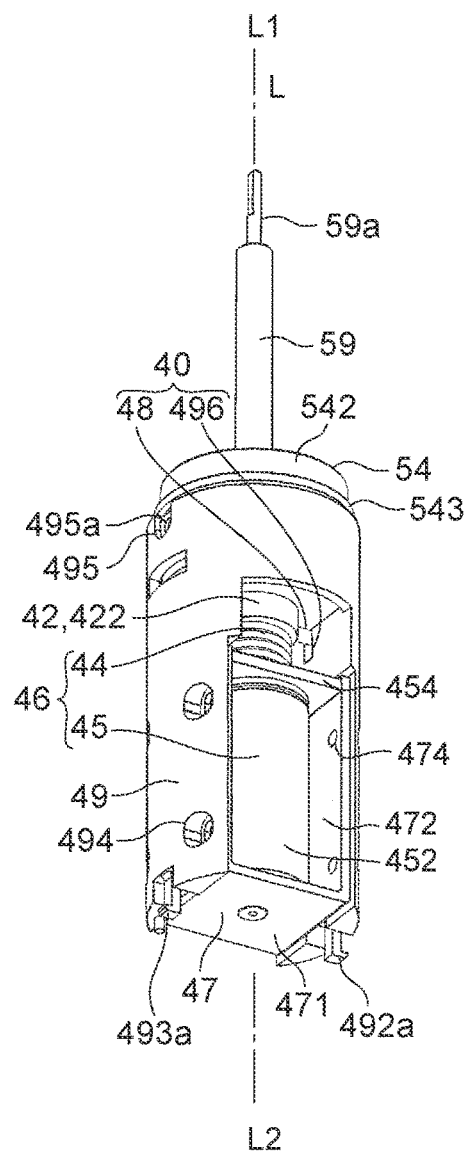
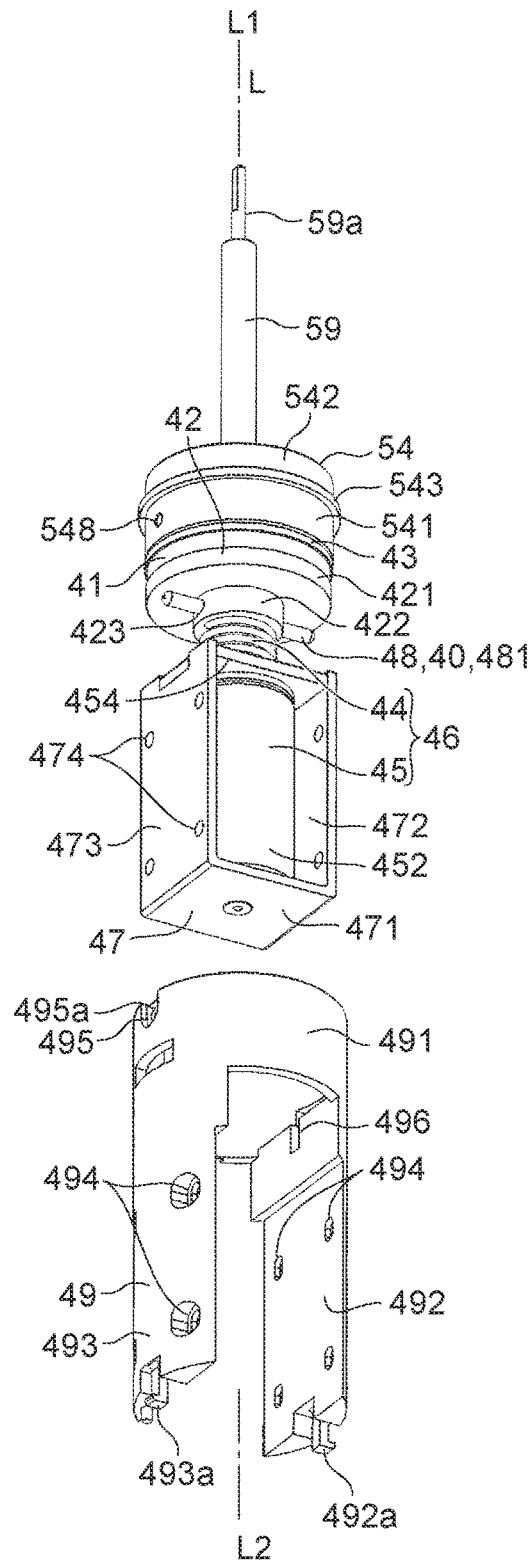

TUBULAR MOTOR, CONTROL METHOD FOR BRUSHLESS MOTOR, AND MOTOR EQUIPPED WITH BRAKE

CROSS REFERENCE TO RELATED APPLICATIONS

This is the U.S. national stage of application No. PCT/JP2015/078005, filed on Oct. 2, 2015. Priority under 35 U.S.C. § 119(a) and 35 U.S.C. § 365(b) is claimed from Japanese Applications Nos. 2014-206270, filed Oct. 7, 2014; 2014-239173, filed Nov. 26, 2014; and 2014-263860, filed Dec. 26, 2014; the disclosures of which are incorporated herein by reference.

FIELD OF THE INVENTION

At least an embodiment of the present invention relates to a tubular motor in which a motor unit and a planetary gear unit are placed inside a tubular case in an axial direction.

At least an embodiment of the present invention relates to a control method for a brushless motor to be used for an electric shutter device and the like.

At least an embodiment of the present invention relates to a motor equipped with a brake, internally having a brake for applying a braking force on a motor shaft.

BACKGROUND

In a tubular motor to be used for a purpose, such as winding a curtain-like article; e.g., a shutter, a shading screen, and the like; a motor unit and a planetary gear unit are placed inside a tubular case in an axial direction (refer to Patent Document 1). In the case of a tubular motor illustrated in FIG. 3 of Patent Document 1, a planetary gear unit is placed in a motor unit so as to be directly adjacent, at an output side, to a bulkhead section that supports a rotor, in such a way as to be rotatable, at an output side of the rotor; so that a planetary gear turns while being supported, from a counter-output side, by a flat surface at the output side of the bulkhead section.

Unfortunately, in a configuration illustrated in FIG. 3 of Patent Document 1, there exists no space for collecting grease at a time when the grease, applied to the planetary gear unit, leaks out. Therefore, in the case of a motor illustrated in FIGS. 1A-1C of Patent Document 1, the output side of the bulkhead section is provided with a concave part into which the grease can flow, and moreover a gear cover is placed between the bulkhead section and the planetary gear unit, and then a planetary gear is supported by the gear cover, from the counter-output side. Under such conditions, an outer side part in a radial direction of the gear cover is sandwiched between a cylindrical part where an internal gear is formed in the planetary gear unit and an outer edge part in a radial direction of the bulkhead section.

A brushless motor includes a rotor provided with a rotor magnet, a stator provided with a plurality of drive coils, a magnetic sensor element for detecting a rotation of the rotor magnet, and the like; and in the meantime, a motor current to be supplied to the drive coils is controlled on the basis of a detection result by the magnetic sensor element. In the case where such a brushless motor is used for an electric shutter device and the like, a load of a shutter's own weight, a biasing force of a spring connected to a winding shaft of the shutter, and the like is externally applied to the rotor. Therefore, at a time when the rotor turns in a direction in which the external load is applied, there is a possibility that the rotor turns at a speed higher than a specified speed so that there appears a problem e.g., that the brushless motor gets damaged.

In the meantime, there is proposed a technology for controlling a motor drive operation on the basis of a comparison result between an actual number of revolutions and a specified number of revolutions, while a shutter winding device being provided with a position sensor such as an encoder, and a rotation sensor such as a tacho-generator (refer to Patent Document 2).

In a tubular motor to be used for a purpose, such as winding a curtain-like article; e.g., a shutter, a shading screen, and the like; a motor unit and a planetary gear unit are placed inside a tubular case in an axial direction (refer to Patent Document 1). Such a tubular motor is configured as a motor equipped with a brake, internally having a brake for applying a braking force on a motor shaft, for the purpose of retaining the shutter and the like at a predetermined position (Patent Document 3).

More specifically to describe, in a motor equipped with a brake, described in Patent Document 3; a brake unit includes three brake discs facing one another in a motor shaft direction; and a braking force to be applied to a motor shaft is generated by way of having the three brake discs contacted in the shaft direction. Incidentally, among the three brake discs, a brake disc placed at a center position is provided with a protrusion that protrudes outward in a radial direction from an outer circumferential surface. In the meantime, a groove stretching in the shaft direction is formed on an internal surface of a cylindrical holder that houses the three brake discs, so that locking the protrusion into the groove prevents the brake disc, placed at the center position, from turning around the shaft axis.

PATENT DOCUMENTS

Patent Document 1: FIGS. 1A-1C and FIG. 3 of Japanese Unexamined Patent Application Publication No. 2007-195284

Patent Document 2: Japanese Unexamined Patent Application Publication No. 2001-288970

Patent Document 3: Japanese Unexamined Patent Application Publication No. 2003-262242

Unfortunately, in the case of either tubular motor illustrated in FIGS. 1A-1C and FIG. 3 of Patent Document 1; at a time when the planetary gear unit is stacked at an output side of the motor unit, or at a time when the planetary gear unit is stacked at an output side of the motor unit by the intermediary of the gear cover, a configuration is made so as to support the planetary gear from a counter-output side. Thus, there exists a problem that an efficiency of assembly work of the tubular motor is low. Moreover, in the case of the tubular motor illustrated in FIGS. 1A-1C of Patent Document 1, there exists a problem that the gear cover to support the planetary gear is needed at the output side of the motor unit, and accordingly the number of components increases.

With the problems described above being taken into consideration, at least an embodiment of the present invention provides a tubular motor for which the number of components can stay less, and moreover the tubular motor can be assembled efficiently, even when a concave part is provided at an output side end surface of an output side end plate section of the motor unit.

Unfortunately, according to a configuration described in Patent Document 2, there exists a problem that it is needed to provide a position sensor such as an encoder, and a rotation sensor such as a tacho-generator, so that a cost of the electric shutter device increases.

With the problem described above being taken into consideration, at least an embodiment of the present invention provides a control method for a brushless motor, which can control a turn of a rotor to which a load is externally applied, even without additionally providing the position sensor such as an encoder, and the rotation sensor such as a tacho-generator.

In order to configure a brake unit, it is needed to prevent one of a plurality of brake discs from turning around a shaft axis. Meanwhile, in the brake unit, a greater braking force can be obtained when the brake discs contact with each other at a further outer position in a radial direction.

Unfortunately, in the case of using a protrusion protruding outward in a radial direction from an outer circumferential surface of a brake disc placed at a center position, in the same way as a configuration described in Patent Document 3; the protrusion is formed at an outer side part in a radial direction of the brake disc placed at a center position, and therefore it is impossible to employ a configuration in which the outer side part in a radial direction contacts with another brake disc. Accordingly, the configuration described in Patent Document 3 has an issue that a braking force is comparatively small, regardless of an outer diameter of the brake disc placed at a center position.

With the problem described above being taken into consideration, at least an embodiment of the present invention provides a motor equipped with a brake, which is able to obtain a great braking force by having members, for generating a braking force, contact with each other at an outer location placed as further as possible in a radial direction.

SUMMARY

In order to solve the problems described above, a tubular motor according to at least an embodiment of the present invention includes: a case being tubular, which stretches in a motor shaft direction; a motor unit provided inside the case; and a first planetary gear unit placed inside the case at an output side with respect to the motor unit in the motor shaft direction; wherein, in the motor unit, a concave part, being recessed toward a counter-output side, is formed in an output side end surface of an output side end plate section that supports a rotor, in such a way as to be rotatable, at an output side of the rotor; in the first planetary gear unit, a planetary carrier is provided with a supporting plate that overlaps with planetary gears at an counter-output side in order to support the planetary gears from the counter-output side; and the first planetary gear unit is immediately adjacent to the output side end plate section at an output side.

According to at least an embodiment of the present invention; in the output side end surface of the output side end plate section, there is formed the concave part recessed toward the counter-output side. Therefore, even when grease, applied to the first planetary gear unit, leaks out of the first planetary gear unit, the leaked grease is collected in the concave part. Accordingly, the grease is not likely to flow into a side of the motor unit. Moreover, the planetary carrier of the first planetary gear unit is provided with the supporting plate that overlaps with the planetary gears at the counter-output side in order to support the planetary gears from the counter-output side; and therefore, the first planetary gear unit is independent as the first planetary gear unit itself. Accordingly, even though there is formed the concave part at the output side end surface of the output side end plate section, it is not needed to support the planetary gears by use of a gear cover and the like. Therefore, the number of components can be reduced. Furthermore, the tubular motor can be assembled efficiently.

In at least an embodiment of the present invention, it is preferable that the first planetary gear unit is provided with a cylindrical member in which an internal gear is formed on an internal surface, and a counter-output side end section of the cylindrical member contacts the output side end plate section. According to such a configuration, the first planetary gear unit and the motor unit can easily be connected so that the tubular motor can be assembled efficiently. Moreover, since the cylindrical member of the first planetary gear unit and the output side end plate section of the motor unit are directly connected, coaxiality between the cylindrical member and the output side end plate section of the motor unit can be improved. Therefore, coaxiality between the first planetary gear unit and the motor unit can be improved.

In at least an embodiment of the present invention, it is preferable that the output side end plate section is provided with an inner circumferential ring convex part protruding toward an output side from the output side end surface; and an outer circumferential ring convex part protruding toward an output side from the output side end surface, the outer circumferential ring convex part being positioned at an outer side of the inner circumferential ring convex part in a radial direction; and a space between the inner circumferential ring convex part and the outer circumferential ring convex part makes up the concave part. According to such a configuration, the grease is not likely to flow into a side of the motor unit.

In at least an embodiment of the present invention, it is preferable that, at the counter-output side end section of the cylindrical member, there is circularly formed a step part where an inner diameter of a section located at a counter-output side is larger than an inner diameter of a part having the internal gear formed there; and at the step part, a first part facing a counter-output side contacts the outer circumferential ring convex part from an output side; and at the step part, a second part facing inside in a radial direction contacts the outer circumferential ring convex part from an outside in a radial direction. According to such a configuration, the grease is unlikely to leak out through a clearance between the output side end plate section and the cylindrical member.

In at least an embodiment of the present invention, it is preferable that, inside the cylindrical member, a second planetary gear unit is placed at an output side of the first planetary gear unit; and in the second planetary gear unit, a planetary carrier is provided with a supporting plate that overlaps with planetary gears at an counter-output side in order to support the planetary gears from a counter-output side. According to such a configuration, the first planetary gear unit and the second planetary gear unit can easily be placed along a motor axis line so that the tubular motor can be assembled efficiently.

In at least an embodiment of the present invention, it is preferable that, inside the cylindrical member, a third planetary gear unit is placed at an output side of the second planetary gear unit; and in the third planetary gear unit, a planetary carrier is provided with a supporting plate that overlaps with planetary gears at an counter-output side in order to support the planetary gears from a counter-output side. According to such a configuration, the third planetary gear unit can also be placed along the motor axis line easily so that the tubular motor can be assembled efficiently.

In at least an embodiment of the present invention, it is preferable that all of an internal gear of the first planetary gear unit, an internal gear of the second planetary gear unit, and an internal gear of the third planetary gear unit are formed on the internal surface of the cylindrical member. According to such a configuration, it is simply needed to install the third planetary gear unit, the second planetary gear unit, and the first planetary gear unit in a sequential order, inside the cylindrical member, so that the tubular motor can be assembled efficiently.

In at least an embodiment of the present invention, it is preferable that inner diameters of the cylindrical member become larger step by step from an output side toward a counter-output side. According to such a configuration, the third planetary gear unit, the second planetary gear unit, and the first planetary gear unit can easily be installed inside the cylindrical member. Moreover, the internal gears can easily be formed on the internal surface of the cylindrical member.

According to at least an embodiment of the present invention; applied may be such a configuration, in which, inside the case, there is provided a brake unit for applying a brake on the rotor of the motor unit at a position adjacent to a counter-output side of the motor unit. Even with the configuration, the grease is unlikely to flow into the brake unit so that operation of the brake unit becomes stable.

In order to solve the problems described above, a control method according to at least an embodiment of the present invention is a control method for a brushless motor including a rotor provided with a rotor magnet, a stator having a plurality of drive coils, and magnetic sensor elements for creating a position detecting signal corresponding to a turning motion of the rotor magnet; the control method comprising: a step of carrying out a turning detection process in order to detect a turn of the rotor, on the basis of a detection result by the magnetic sensor elements, before starting to supply the drive coils with electricity, in a first direction driving process for driving the rotor to turn in a first direction, wherein a load for turning in the first direction being externally applied to the rotor; a step of supplying the plurality of drive coils with a drive current for driving the rotor to turn in the first direction, in the case where a turning speed of the rotor is less than a threshold, according to a detection result of the turning detection process; and a step of applying a braking force to the rotor, in the case where the turning speed of the rotor is equal to or higher than the threshold.

According to at least an embodiment of the present invention; at a time of driving the rotor to turn in the first direction, wherein the load for turning in the first direction being externally applied to the rotor; the turning detection process is carried out in order to detect a turn of the rotor before starting to supply the drive coils with electricity; and in the case where the turning speed of the rotor is equal to or higher than the threshold, the braking force is applied to the rotor. Therefore, it is possible to inhibit the rotor from turning at a speed higher than a target speed. Moreover, the magnetic sensor elements for creating a position detecting signal are used in the turning detection process, and therefore it is not needed to provide a position sensor such as an encoder, and a rotation sensor such as a tacho-generator. Accordingly, a cost reduction can be implemented.

In at least an embodiment of the present invention, it is preferable that the braking force is generated by way of short-circuiting both terminals of at least one drive coil out of the plurality of drive coils. According to such a configuration, the braking force can be generated by way of controlling energization for the drive coils.

In at least an embodiment of the present invention, it is preferable that, at a time of applying the braking force to the rotor, a comparison is made between a commanded speed for driving the rotor to turn in the first direction, and a turning speed of the rotor detected by the magnetic sensor elements; in order to change a level of the braking force, on the basis of a comparison result between the commanded speed and the turning speed. According to such a configuration, an appropriate braking force can be applied to the rotor.

In at least an embodiment of the present invention, it is preferable that, in a second direction driving process for driving the rotor to turn in a second direction, being opposite to the first direction; without the turning detection process, the plurality of drive coils are supplied with a drive current for driving the rotor to turn in the second direction. According to such a configuration, the number of operation steps can be reduced so that a load on controlling operation can be lessened.

In at least an embodiment of the present invention, it is preferable that, after supplying the plurality of drive coils with the drive current, a turn of the rotor is detected on the basis of the detection result by the magnetic sensor elements; and if the turning speed of the rotor is lower than a specified speed value, the drive current is increased; and in the meantime, if the turning speed of the rotor is lower than a specified speed value, the drive current is decreased. According to such a configuration, an actual turning speed can be fed back for the drive current, so that it is possible to make the turning speed of the rotor closer to the specified speed value.

According to at least an embodiment of the present invention; applied may be such a configuration, in which the rotor is connected to a turning shaft for winding a shutter, by the intermediary of a series of speed-reduction gears. In the case of such a configuration; the shutter's own weight and the biasing force of the biasing member connected to the turning shaft (a winding shaft) for winding the shutter are applied to the rotor, as an external load to turn the rotor in the first direction. Even in that case, it is still possible to inhibit the rotor from turning at a speed higher than a target speed.

In order to solve the problems described above, a motor equipped with a brake according to at least an embodiment of the present invention includes: a motor unit including a motor shaft being rotatable around an axis line; and a brake unit for applying a braking force to the motor shaft; wherein, the brake unit includes: a disc-like first plate that turns together with the motor shaft; a second plate that faces the first plate in a shaft direction; a cylindrical holder placed around the second plate; a turning prevention mechanism that prevents the second plate from turning around the axis line; and a plate drive mechanism that drives the second plate to one direction for making the first plate and the second plate contact with each other as well as to the other direction for making the first plate and the second plate draw apart from each other; and the second plate includes: a plate part that faces the first plate, and a convex part that protrudes from the plate part toward a counter side being opposite to the first plate; and the turning prevention mechanism prevents the second plate from turning, between the convex part and the cylindrical holder; and at a time when the plate drive mechanism has the first plate and the second plate contact with each other, the first plate and the second plate contact with each other at least at an outer part in a radial direction, in such a way as to generate the braking force.

According to at least an embodiment of the present invention; the second plate is activated by the plate drive mechanism, in order to have the first plate and the second plate contact with each other so as to generate a braking force. Meanwhile, for the second plate, there is configured the turning prevention mechanism that prevents the second plate from turning around the axis line; wherein the turning prevention mechanism is configured between the convex part, protruding from the plate part of the second plate toward a counter side being opposite to the first plate, and the cylindrical holder. Therefore, a braking force can be generated by way of having at least the first plate and the second plate contacted with each other at an outer location placed as further as possible in a radial direction. Accordingly, a great braking force can be generated, without excessively enlarging an outer diameter of the first plate and an outer diameter of the second plate.

In at least an embodiment of the present invention, applied may be such a configuration, in which the turning prevention mechanism includes: rod parts protruding outward in a radial direction from the convex part, and grooves stretching along the shaft direction in an internal surface of the cylindrical holder; where ends of the rod parts at an outside in the radial direction being fitted into the grooves.

In at least an embodiment of the present invention, it is preferable that the rod parts are materialized with ends of a connection rod that connects the convex part and a linear motion shaft of the plate drive mechanism. According to such a configuration, the turning prevention mechanism can be configured by making use of the connection rod for connecting the second plate and the linear-motion shaft of the plate drive mechanism, and therefore a structure of the brake unit can be simplified.

In at least an embodiment of the present invention, it is preferable that the first plate is a friction plate; an outer diameter of the second plate is larger than an outer diameter of the first plate; and at a time when the first plate and the second plate contact with each other by means of the plate drive mechanism, at least an end section of an outermost part in a radial direction of the first plate and the second plate contact with each other in such a way as to generate the braking force. According to such a configuration; between the first plate and the second plate, a great braking force can be generated by making use of the outer diameter of the first plate, configured as the friction plate, at a maximum.

In at least an embodiment of the present invention, it is preferable that the first plate is provided with a first ring convex part at the end section of the outermost part in a radial direction of a surface that faces the second plate, where the first ring convex part protruding toward the second plate. According to such a configuration; since the first ring convex part (the end section of the outer side in a radial direction) of the first plate contacts the second plate for sure, a great braking force can be generated between the first plate and the second plate.

In at least an embodiment of the present invention, it is preferable that the motor includes a receiver surface that faces the first plate at a counter side being opposite to the second plate, where the receiver surface being unable to move in the shaft direction nor turn around the axis line; and at a time when the second plate contacts the first plate, the receiver surface contacts at least an outer part in a radial direction of the first plate. According to such a configuration; a great braking force can also be generated between the first plate (friction plate) and the receiver surface.

In at least an embodiment of the present invention, it is preferable that an outer diameter of the receiver surface is larger than the outer diameter of the first plate; and at a time when the first plate and the second plate contact with each other by means of the plate drive mechanism, the receiver surface contacts at least the end section of the outermost part in a radial direction of the first plate. According to such a configuration; between the first plate (friction plate) and the receiver surface, the great braking force can be obtained by making use of the outer diameter of the first plate, configured as the friction plate, at a maximum.

In at least an embodiment of the present invention, it is preferable that the first plate is provided with a second ring convex part protruding toward the receiver surface at an end section of an outermost part in a radial direction of a surface that faces the receiver surface. According to such a configuration; since the second ring convex part (the end section of the outer side in a radial direction) of the first plate contacts the receiver surface for sure, a great braking force can be generated between the first plate and the receiver surface.

In at least an embodiment of the present invention, applied may be such a configuration, in which the receiver surface is a surface of the third plate, at a side facing the first plate, where the third plate being fixed to a bearing holder that holds a radial bearing unit for the motor shaft.

In at least an embodiment of the present invention, applied may be such a configuration, in which the plate drive mechanism includes a spring element for biasing the second plate toward the first plate, and a linear actuator for interrupting the biasing motion by the spring element.

In this case, applied may be such a configuration, in which the linear actuator is a solenoid actuator.

In at least an embodiment of the present invention, applied may be such a configuration, in which the motor includes a speed-reducer section for speed-reducing a turning motion of the motor shaft and transmitting the turning motion slowed down to an output member, where the speed-reducer section being located at a counter side being opposite to the brake unit with respect to the motor unit.

According to at least an embodiment of the present invention; in the output side end surface of the output side end plate section, there is formed the concave part recessed toward the counter-output side. Therefore, even when grease, applied to the first planetary gear unit, leaks out of the first planetary gear unit, the leaked grease is collected in the concave part. Accordingly, the grease is not likely to flow into a side of the motor unit. Moreover, the planetary carrier of the first planetary gear unit is provided with the supporting plate that overlaps with the planetary gears at the counter-output side in order to support the planetary gears from the counter-output side; and therefore, the first planetary gear unit is independent as the first planetary gear unit itself. Accordingly, even though there is formed the concave part at the output side end surface of the output side end plate section, it is not needed to support the planetary gears by use of a gear cover and the like. Therefore, the number of components can be reduced. Furthermore, the tubular motor can be assembled efficiently.

According to at least an embodiment of the present invention; at a time of driving the rotor to turn in the first direction, wherein the load for turning in the first direction being externally applied to the rotor; the turning detection process is carried out in order to detect a turn of the rotor before starting to supply the drive coils with electricity; and in the case where the turning speed of the rotor is equal to or higher than the threshold, the braking force is applied to the rotor by way of short-circuiting a plurality of drive coils. Therefore, it is possible to inhibit the rotor from turning at a speed higher than a target speed. Moreover, the magnetic sensor elements for creating an FG signal are used in the turning detection process, and therefore it is not needed to provide a position sensor such as an encoder, and a rotation sensor such as a tacho-generator. Accordingly, a cost reduction can be implemented.

According to at least an embodiment of the present invention; the second plate is activated by the plate drive mechanism, in order to have the first plate and the second plate contact with each other so as to generate a braking force. Meanwhile, for the second plate, there is configured the turning prevention mechanism that prevents the second plate from turning around the axis line; wherein the turning prevention mechanism is configured between the convex part, protruding from the plate part of the second plate toward a counter side being opposite to the first plate, and the cylindrical holder. Therefore, a braking force can be generated by way of having at least the first plate and the second plate contact with each other at an outer part in a radial direction. Accordingly, a great braking force can be generated, without excessively enlarging an outer diameter of the first plate and an outer diameter of the second plate.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6A through 6C are explanatory drawings of planetary gear units employed in the speed-reducer unit of the tubular motor to which at least an embodiment of the present invention is applied.

FIGS. 13A through 13C are cross-sectional drawings of the motor equipped with a brake, to which at least an embodiment of the present invention is applied.

FIGS. 15A through 15B are explanatory drawings of the motor unit employed in the motor equipped with a brake, to which at least an embodiment of the present invention is applied.

FIGS. 16A through 16C are exploded perspective views of a brake unit in the motor equipped with a brake, to which at least an embodiment of the present invention is applied.

FIGS. 17A through 17B are explanatory drawings of a turning prevention mechanism of the brake unit in the motor equipped with a brake, to which at least an embodiment of the present invention is applied.

DETAILED DESCRIPTION

At least an embodiment of the present invention is explained below with reference to FIGS. 1A-1C through FIGS. 6A-6C.

A tubular motor, to which at least an embodiment of the present invention is applied, is explained below with reference to the drawings. In the following explanation, while a motor axis line being provided with a symbol 'L'; a symbol 'L1' is provided to an output side where a motor shaft protrudes, and a symbol 'L2' is provided to a counter side (a counter-output side) which is opposite to the side where the motor shaft protrudes.

(General Structure)

Figure 1A:
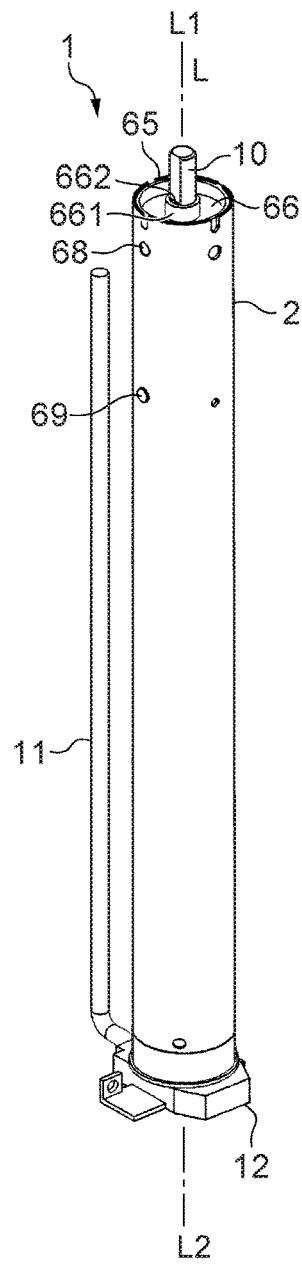
FIGS. 1A through 1C include explanatory drawings of a tubular motor to which at least an embodiment of the present invention is applied.
Figure 1B:
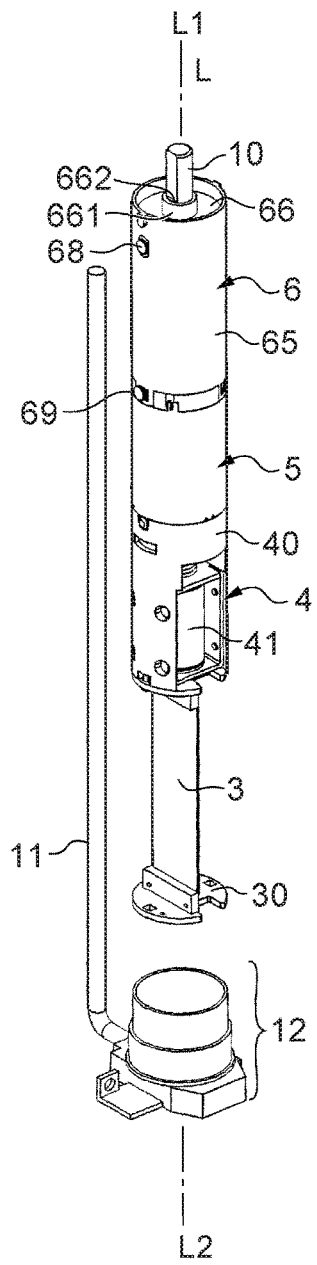
Figure 1C:
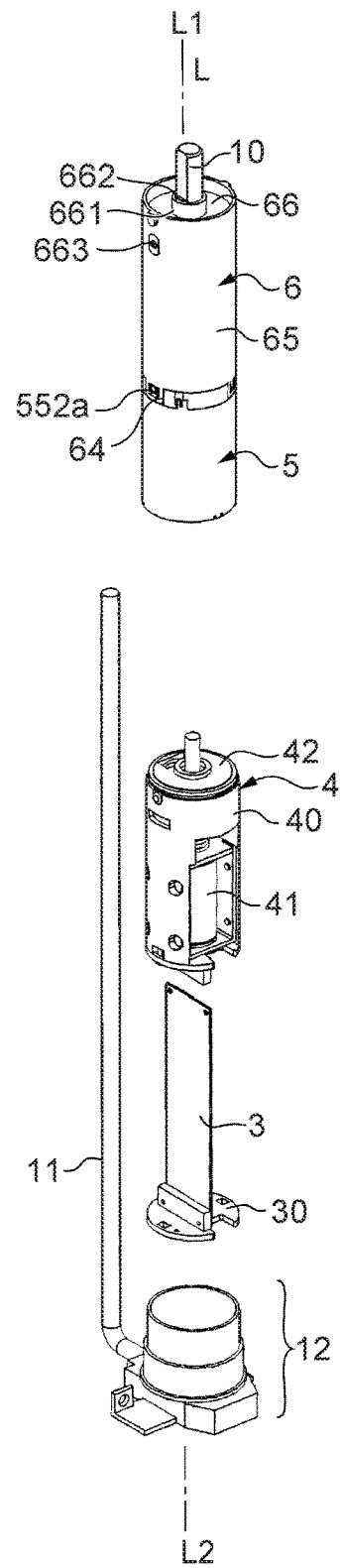
Figure 2A:
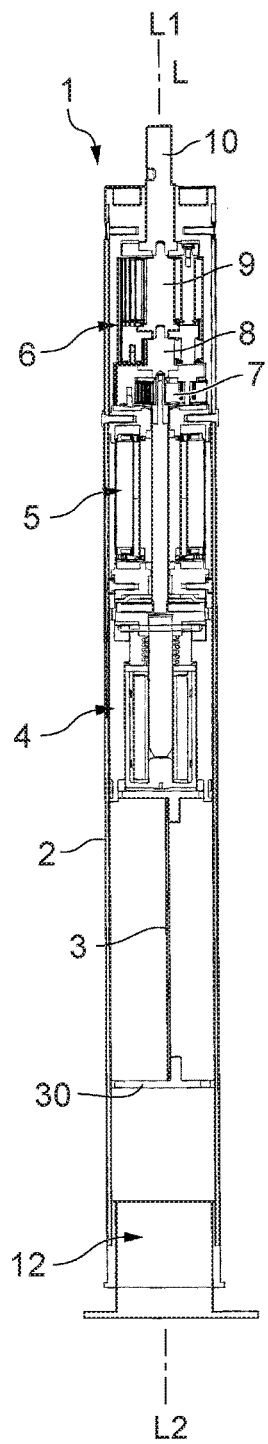
FIGS. 2A through 2B are cross-sectional drawings of the tubular motor to which at least an embodiment of the present invention is applied.
Figure 2B:
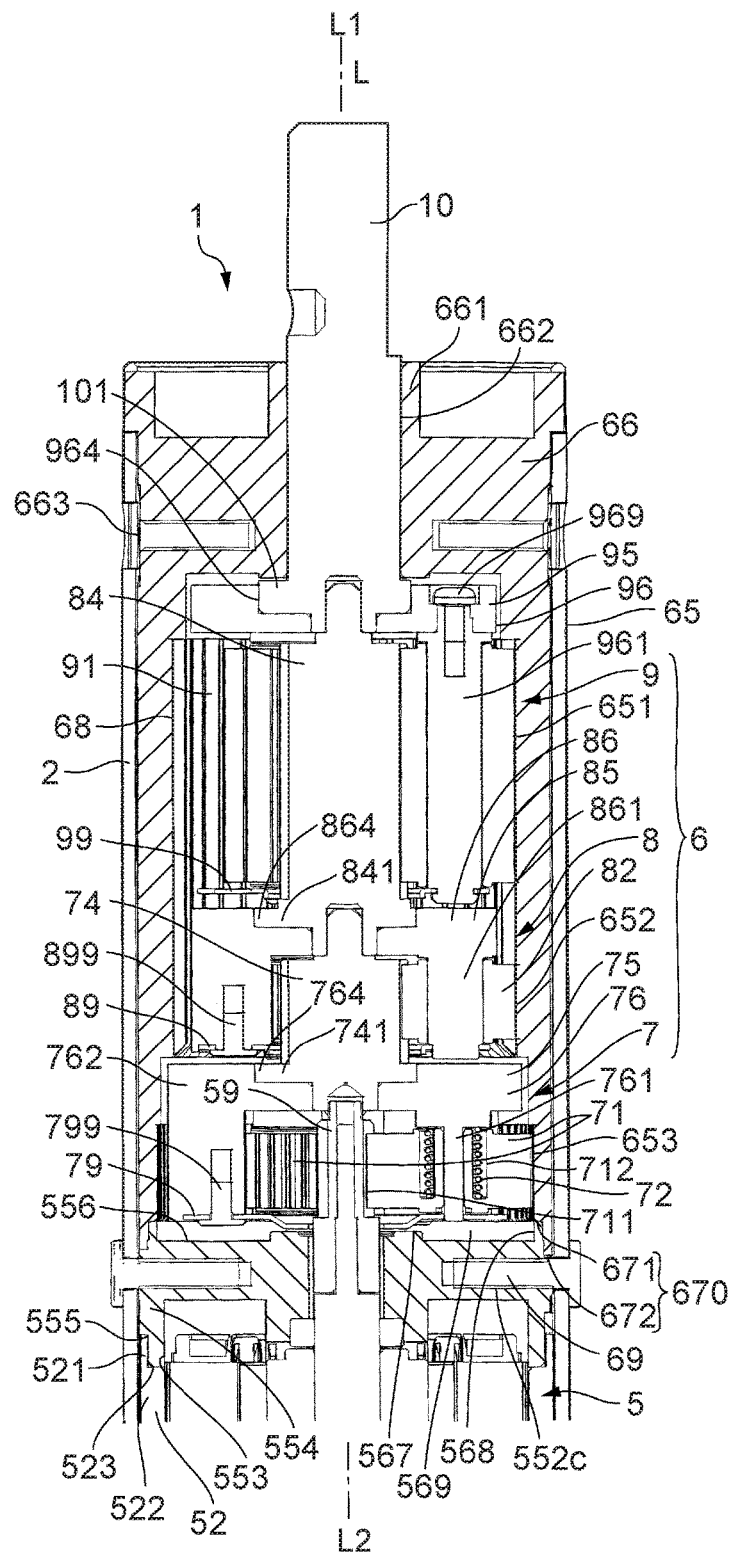

FIGS. 1A-1C includes explanatory drawings of a tubular motor 1 to which at least an embodiment of the present invention is applied; wherein FIG. 1A, FIG. 1B, and FIG. 1C are a perspective view of the tubular motor 1, a perspective view showing conditions under which a case 2 is removed from the tubular motor 1, and an exploded perspective view of units housed inside the case, respectively. FIGS. 2A-2B include cross-sectional drawings of the tubular motor 1 to which at least an embodiment of the present invention is applied; wherein FIG. 2A and FIG. 2B are a general cross-sectional drawing of the tubular motor 1, and a cross-sectional drawing that shows a boundary part and the like, in a magnified view, between a motor unit and a speed-reducer unit 6, respectively.

The tubular motor 1 shown in FIGS. 1A-1C and FIGS. 2A-2B is a motor to be used for a purpose, such as winding a curtain-like article; e.g., a shutter, a shading screen, and the like; and the motor includes the case 2 being tubular, which stretches in a motor shaft direction 'L'. Inside the case 2, there are placed in a direction from the counter-output side 'L2' to the output side 'L1'; a circuit board 3, a brake unit 4, a motor unit 5, and a speed-reducer unit 6, in this order; wherein a motor shaft 10 protrudes from the speed-reducer unit 6 toward the output side 'L1'. For the circuit board 3, a board holder 30 is placed at an end part of the counter-output side 'L2'. The circuit board 3 is held by the case 2, through the intermediary of the board holder 30. At an end part of the counter-output side 'L2' of the case 2, there is provided a connector 12 in order to connect the circuit board 3 and wiring 11; and in the meantime, the connector 12 and the circuit board 3 are connected with lead wire (not illustrated) and the like. The brake unit 4 is a friction-type brake unit having a solenoid 41, a friction plate 42, and the like; the brake unit being supported with a holder 40.

(Structure of the Motor Unit 5)

Figure 3:
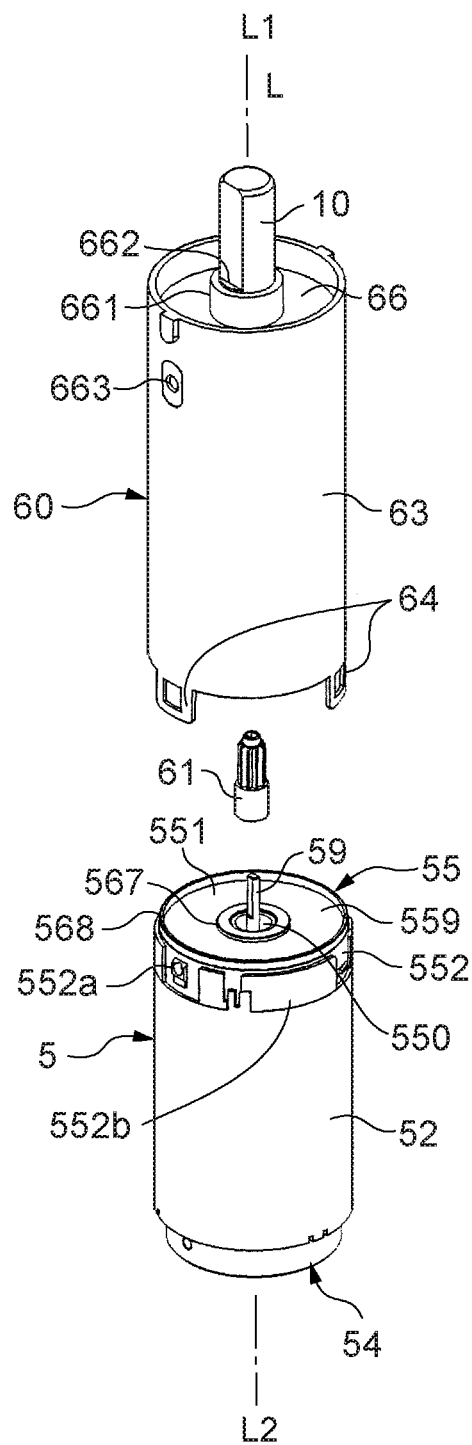
FIG. 3 is a perspective view showing an external appearance of a motor unit and a speed-reducer unit of the tubular motor to which at least an embodiment of the present invention is applied.
Figure 4A:
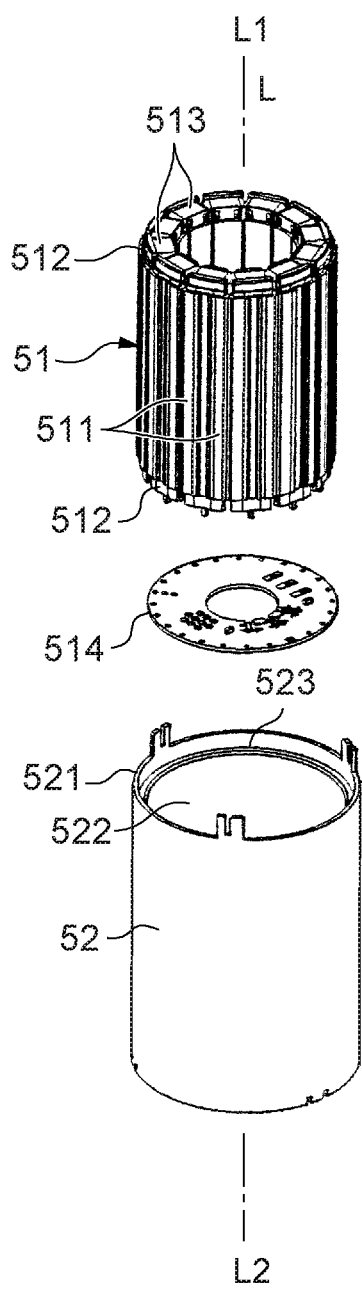
FIGS. 4A through 4B are explanatory drawings of the motor unit employed in the tubular motor to which at least an embodiment of the present invention is applied.
Figure 4B:
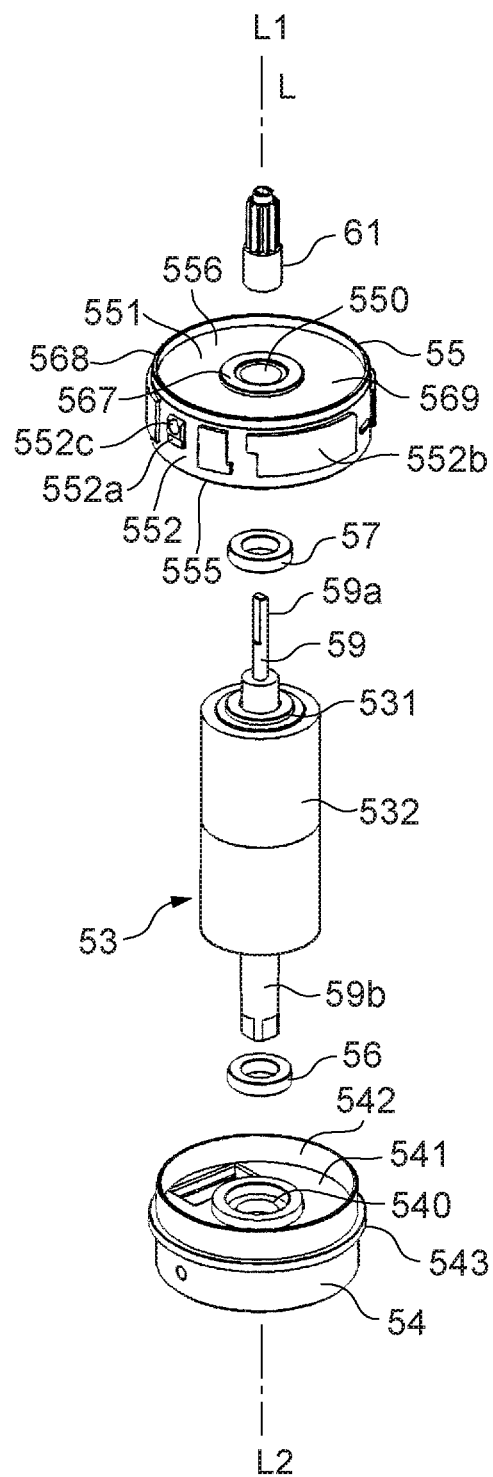

FIG. 3 is a perspective view showing an external appearance of the motor unit 5 and the speed-reducer unit 6 of the tubular motor 1 to which at least an embodiment of the present invention is applied. FIGS. 4A-4B includes explanatory drawings of the motor unit 5 employed in the tubular motor 1 to which at least an embodiment of the present invention is applied; wherein FIG. 4A and FIG. 4B are an exploded perspective view of a stator and the like, and a perspective view of a rotor and the like, respectively.

As shown in FIGS. 2A-2B and FIG. 3, the motor unit 5 and the speed-reducer unit 6 are placed coaxially, in such a way that a turning shaft 59 protruding from the motor unit 5 toward the output side 'L1' is fitted with an output gear 61 for output to the speed-reducer unit 6.

As shown in FIGS. 4A-4B, a stator 51 in the motor unit 5 includes a plurality of cores 511 placed in a circumferential direction, insulators 512 covering both ends of the cores 511, and coils 513 wound on the cores 511 by the intermediary of the insulators 512; wherein the plurality of cores 511 are held by a core holder 52 being cylindrical. In the meantime, a motor circuit board 514 is held at an end surface of the counter-output side 'L2' of the stator 51.

In the motor unit 5, a rotor 53 includes; the turning shaft 59 that stretches in the motor shaft direction 'L'; a yoke 531 being cylindrical, fixed on an outer circumferential surface of the turning shaft 59; and a magnet 532 being cylindrical, fixed on an outer circumferential surface of the yoke 531. In the turning shaft 59, an output side shaft part 59a protruding toward the output side 'L1' is fitted with the with the output gear 61; and in the meantime, a counter-output side shaft part 59b protruding toward the counter-output side 'L2' is connected to the brake unit 4.

In the motor unit 5; a counter-output side end plate section 54, which supports the rotor 53 so as to be rotatable, is placed at a counter-output side 'L2' of the rotor 53; and meanwhile, an output side end plate section 55, which supports the rotor 53 so as to be rotatable, is placed at an output side 'L1' of the rotor 53. The counter-output side end plate section 54 includes; a disc part 541 in which a shaft hole 540 is formed at a center position, a cylindrical part 542 stretching from an outer rim of the disc part 541 toward an output side 'L1', and a convex part 543 like a rib, protruding outward in a radial direction at a center of the cylindrical part 542 in the motor shaft direction 'L'; wherein the convex part 543 is formed around an entire circumference of the cylindrical part 542. The shaft hole 540 is a stepped hole having a step part toward an output side 'L1'; in the shaft hole 540, there is held an annular bearing 56 that supports the counter-output side shaft part 59b of the turning shaft 59 so as to be rotatable. The bearing 56 is materialized with an oil-impregnated sintered bearing and the like.

The output side end plate section 55 includes; a disc part 551 in which a shaft hole 550 is formed at a center position, and a cylindrical part 552 stretching from an outer rim of the disc part 551 toward a counter-output side 'L2'. The shaft hole 550 is a stepped hole having a step part toward a counter-output side 'L2'; in the shaft hole 550, there is held an annular bearing 57 that supports the output side shaft part 59a of the turning shaft 59 so as to be rotatable. The bearing 57 is materialized with an oil-impregnated sintered bearing and the like.

In the output side end plate section 55; at an output side end surface 556 of the disc part 551, there is formed an annular inner circumferential ring convex part 567 protruding toward the output side 'L1' at an inner side in a radial direction, and there opens the shaft hole 550 at an inner side of the inner circumferential ring convex part 567. Moreover, at the output side end surface 556 of the disc part 551, there is formed an annular outer circumferential ring convex part 558 protruding toward the output side 'L1', being positioned at an outer side of the inner circumferential ring convex part 567 in a radial direction, and meanwhile at an inner side of an outer rim of the disc part 551 in the radial direction. Then, a space between the inner circumferential ring convex part 567 and the outer circumferential ring convex part 558 makes up a ring concave part 569 that is recessed toward the counter-output side 'L2'.

In the output side end plate section 55; on an outer circumferential surface of the cylindrical part 552, there are formed engaging convex parts 552a and 552b protruding in an outer radial direction. Therefore, at a time when the cylindrical part 552 of the output side end plate section 55 is fitted into an inner side of the core holder 52, an output side end part 521 of the core holder 52 contacts with the engaging convex part 552b. Moreover, at an inner circumferential surface of the core holder 52, there is formed a step part 523 where an inner diameter of the output side end part 521 is larger than an inner diameter of a section 522, which is positioned closer to the counter-output side 'L2' than the output side end part 521 is. On the other hand, at an outer circumferential surface of the cylindrical part 552 of the output side end plate section 55, there is formed a step part 555 where an outer diameter of a counter-output side end part 553, positioned at an end part of a counter-output side 'L2', is smaller than an outer diameter of a section 554, which is positioned closer to the output side 'L1' than the counter-output side end part 553 is. Therefore, as shown in FIG. 2B, at a time when the cylindrical part 552 of the output side end plate section 55 is fitted into an inner side of the core holder 52, the output side end part 521 of the core holder 52 overlaps with the counter-output side end part 553 of the output side end plate section 55 from an outside in a radial direction, and contacts with a section facing toward a counter-output side 'L2', at the step part 555, from the counter-output side 'L2'. In this way, a location of the output side end plate section 55 in relation to the core holder 52 is set up in the motor shaft direction 'L'.

(Structure of the Speed-Reducer Unit 6)

Figure 5A:
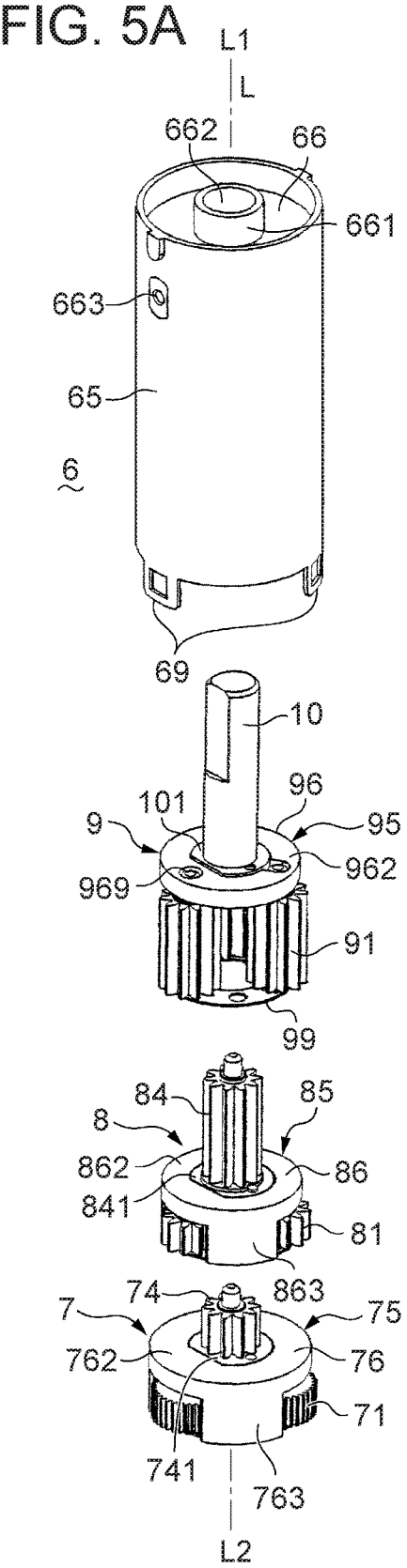
FIGS. 5A through 5C are explanatory drawings of the speed-reducer unit employed in the tubular motor to which at least an embodiment of the present invention is applied.
Figure 5B:
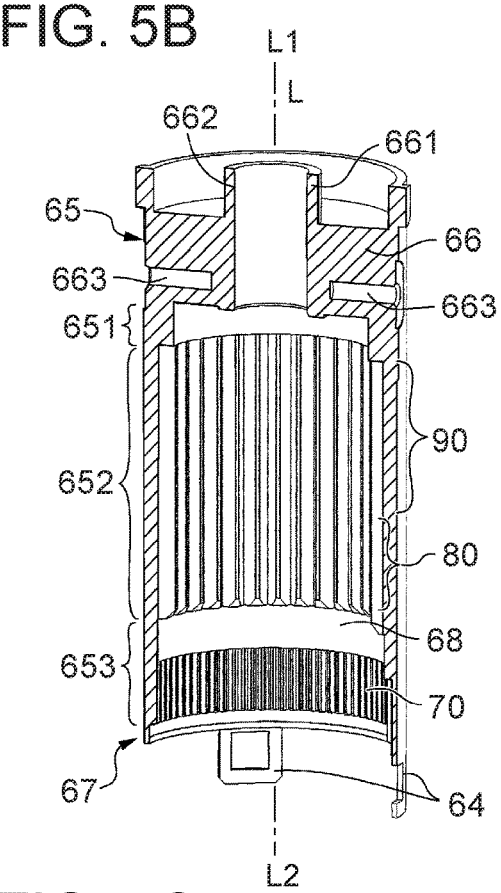
Figure 5C:
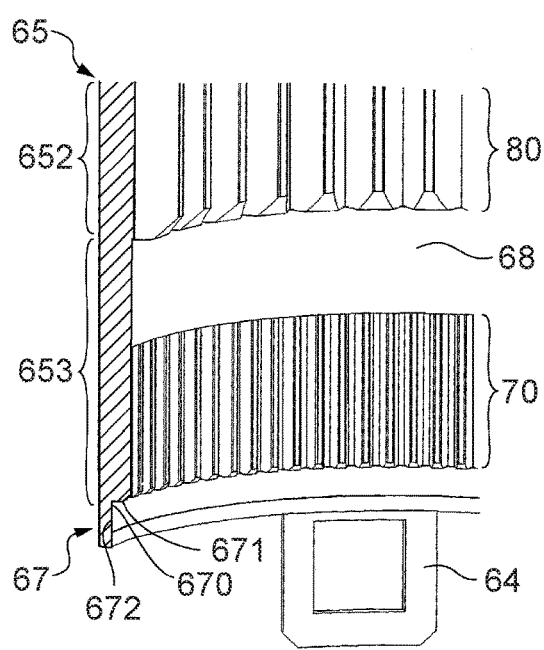

FIGS. 5A-5C includes explanatory drawings of the speed-reducer unit 6 employed in the tubular motor 1 to which at least an embodiment of the present invention is applied; wherein, FIG. 5A, FIG. 5B, and FIG. 5C are an exploded perspective view of the speed-reducer unit 6, a cross-sectional drawing of a cylindrical body, and a cross-sectional drawing that shows a magnified view of a counter-output side end part of the cylindrical body, respectively. FIGS. 6A-6C include explanatory drawings of planetary gear units employed in the speed-reducer unit 6 of the tubular motor 1 to which at least an embodiment of the present invention is applied; wherein, FIG. 6A, FIG. 6B, and FIG. 6C are an exploded perspective view of a first planetary gear unit 7, an exploded perspective view of a second planetary gear unit 8, and an exploded perspective view of a third planetary gear unit 9, respectively.

As shown in FIGS. 5 A-5C, in the speed-reducer unit 6; there are placed the first planetary gear unit 7, the second planetary gear unit 8, and the third planetary gear unit 9, in this order from a counter-output side 'L2' toward an output side 'L1' in a direction of the motor shaft direction 'L'; wherein a cylinder-like cylindrical member 65 is placed at an outside in a radial direction of the first planetary gear unit 7, the second planetary gear unit 8, and the third planetary gear unit 9.

In the first planetary gear unit 7, an internal gear 70 is formed at a section in a counter-output side 'L2', on an internal surface 68 of the cylindrical member 65. Moreover, an internal gear 80 of the second planetary gear unit 8 is formed at a section in an output side 'L1', in relation to the internal gear 70, on the internal surface 68 of the cylindrical member 65. Furthermore, an internal gear 90 of the third planetary gear unit 9 is formed at a section in an output side 'L1', in relation to the internal gear 80, on the internal surface 68 of the cylindrical member 65. In the present embodiment, the internal gear 80 and the internal gear 90 are formed together continuously in the direction of the motor shaft direction 'L'. According to such a configuration; even though there are provided the first planetary gear unit 7, the second planetary gear unit 8, and the third planetary gear unit 9, a structure of the speed-reducer unit 6 can be simplified.

Incidentally, inner diameters of the cylindrical member 65 are enlarged in a step-by-step manner, from the output side 'L1' toward the counter-output side 'L2'. More specifically to describe, the cylindrical member 65 has an end plate part 66 at the output side 'L1', and a relationship among; an inner diameter of a first tubular part 651 with a full thickness, being adjacent to the end plate part 66 at a counter-output side 'L2'; an inner diameter of a second tubular part 652, being adjacent to the first tubular part 651 at a counter-output side 'L2'; and an inner diameter of a third tubular part 653, being adjacent to the second tubular part 652 at a counter-output side 'L2'; is as described below:

the first tubular part 651<the second tubular part 652<the third tubular part 653.

In the tubular parts, the internal gear 80 and the internal gear 90 are formed in the second tubular part 652; and meanwhile the internal gear 70 is formed in the tubular part 653.

At a center of the end plate part 66, a tubular part 661 protrudes toward the output side 'L1', and an inner side of the tubular part 661 is provided with a shaft hole 662 through which the motor shaft 10 is inserted. Moreover, in the end plate part 66, there is formed a hole 663 that opens at a side surface section; wherein a screw 68 (refer to FIGS. 1A-1C) is placed into the hole 663 so as to set the case 2 and the cylindrical member 65 together. Furthermore, a engaging part 64 protrudes toward a counter-output side 'L2' from an end part of the counter-output side 'L2' of the cylindrical member 65, so as to engage with the engaging convex part 552a (refer to FIGS. 4A-4B) of the output side end plate section 55. In the meantime, a screw 69 is placed into a hole 552c (refer to FIGS. 4A-4B) of the engaging convex part 552a so as to set together the case 2, the cylindrical member 65, and the output side end plate section 55.

In FIGS. 5A-5C and FIGS. 6A-6C, the first planetary gear unit 7 uses the output gear 61 (refer to FIG. 3 and FIGS. 4A-4B) as a sun gear, the output gear 61 being fixed to the turning shaft 59 of the motor unit 5; and the first planetary gear unit 7 includes three planetary gears 71 that engage with the output gear 61, and a planetary carrier 75 for supporting the planetary gears 71. In the present embodiment, the planetary carrier 75 includes a holder 76 equipped with three supporting shafts 761 for individually supporting three planetary gears 71 so as to be rotatable; and in the holder 76, the supporting shafts 761 stretch from a disc part 762 located at an output side 'L1', toward a counter-output side 'L2'. Moreover, the holder 76 has supporting plate parts 763 that protrude from an outer rim of the disc part 762 toward a counter-output side 'L2'. The supporting plate parts 763 are formed at three positions located distantly one another in a circumferential direction. Then, from an interval between every two supporting plate parts 763, each of the planetary gears 71 partially protrudes outward in a radial direction, in such a way as to engage with the internal gear 70.

At an end of the supporting plate parts 763 of a counter-output side 'L2', there is fixed a supporting plate 79 by use of screws 799. Being shaped like a circular ring, the supporting plate 79 is provided with a hole 790 formed at a center of the supporting plate 79, wherein the turning shaft 59 goes through the hole 790. Meanwhile, around the hole 790, there are formed holes 791 for having a shaft part of each of the screws 799 go through, and holes 792 for having an end part at a counter-output side 'L2', of each of the supporting shafts 761, fitted in. According to the present embodiment, in each of the planetary gears 71, there is formed a circular groove 712 around a shaft hole 711 in which each of the supporting shafts 761 is fitted, and then a coil spring 72 is placed at the circular groove 712. Therefore, each of the planetary gears 71 is biased toward a counter-output side 'L2' by the coil spring 72 so as to be supported by the supporting plate 79 at the counter-output side 'L2'.

In the planetary carrier 75, on a surface at an output side 'L1' of the disc part 762, there is formed a concave part 764; and in the concave part 764, an end part 741 of a counter-output side 'L2' of an output gear 74 is fixed by use of screws 749. Then, the output gear 74 is used as a sun gear for the second planetary gear unit 8. Incidentally, the planetary carrier 75 is supported so as to be rotatable by the output gear 61, by the intermediary of the output gear 74.

The second planetary gear unit 8 includes three planetary gears 81 that engage with the output gear 74, and a planetary carrier 85 for supporting the planetary gears 81. In the present embodiment, the planetary carrier 85 includes a holder 86 equipped with three supporting shafts 861 for individually supporting the three planetary gears 81 so as to be rotatable; and in the holder 86, the supporting shafts 861 stretch from a disc part 862 located at an output side 'L1', toward a counter-output side 'L2'. Moreover, the holder 86 has supporting plate parts 863 that protrude from an outer rim of the disc part 862 toward a counter-output side 'L2'. The supporting plate parts 863 are formed at three positions located distantly one another in a circumferential direction. Then, from an interval between every two supporting plate parts 863, each of the planetary gears 81 partially protrudes outward in a radial direction, in such a way as to engage with the internal gear 80.

At an end of the supporting plate parts 863 of a counter-output side 'L2', there is fixed a supporting plate 89 by use of screws 899. Being shaped like a circular ring, the supporting plate 89 is provided with a hole 890 formed at a center of the supporting plate 89, wherein the output gear 74 goes through the hole 890. Meanwhile, around the hole 890, there are formed holes 891 for having a shaft part of each of the screws 899 go through, and engaging holes 892 for having an end part at a counter-output side 'L2', of each of the supporting shafts 861, engaged with. The supporting plate 89 supports the planetary gears 81 at a counter-output side 'L2'.

In the planetary carrier 85, on a surface at an output side 'L1' of the disc part 862, there is formed a concave part 864; and in the concave part 864, an end part 841 of a counter-output side 'L2' of an output gear 84 is fixed by use of screws 849. Then, the output gear 84 is used as a sun gear for the third planetary gear unit 9. Incidentally, the planetary carrier 85 is supported so as to be rotatable by the output gear 74, by the intermediary of the output gear 84.

The third planetary gear unit 9 includes three planetary gears 91 that engage with the output gear 84, and a planetary carrier 95 for supporting the planetary gears 91. In the present embodiment, the planetary carrier 95 includes a disc-like holder 96, in which three supporting shafts 961 stretch toward a counter-output side 'L2'. Each of the supporting shafts 961 is fixed to a disc part 962 of the holder 96, by use of a screw 969, in such a way that the three supporting shafts 961 individually support the three planetary gears 91 so as to be rotatable. Then, each of the planetary gears 91 partially protrudes outward in a radial direction, in such a way as to engage with the internal gear 90.

Meanwhile, at an end of the supporting shafts 961 of a counter-output side 'L2', there is fixed a supporting plate 99. Being shaped like a circular ring, the supporting plate 99 is provided with a hole 990 formed at a center of the supporting plate 99, wherein the output gear 84 goes through the hole 990. Meanwhile, around the hole 990, there are formed engaging holes 992 for having an end part at a counter-output side 'L2', of each of the supporting shafts 961, engaged with. The supporting plate 99 supports the planetary gears 91 at a counter-output side 'L2'.

In the planetary carrier 95, on a surface at an output side 'L1' of the disc part 962, there is formed a concave part 964; and in the concave part 964, an end part 101 of a counter-output side 'L2' of the motor shaft 10 is fixed by use of screws 949. Incidentally, the planetary carrier 95 is supported so as to be rotatable by the output gear 84, by the intermediary of the motor shaft 10.

By way of the speed-reducer unit 6 configured as described above; at a time when the motor unit 5 operates to turn the turning shaft 59, a turning motion of the turning shaft 59 is speed-reduced at each step of the first planetary gear unit 7, the second planetary gear unit 8, and the third planetary gear unit 9, so as to be transmitted to the motor shaft 10.

(Connection Structure Between the Motor Unit 5 and the Speed-Reducer Unit 6)

In the first planetary gear unit 7, the second planetary gear unit 8, and the third planetary gear unit 9 of the tubular motor 1 according to the present embodiment; the planetary carrier 75, the planetary carrier 85, and the planetary carrier 95 are provided with the supporting plate 79, the supporting plate 89, and the supporting plate 99 for supporting the planetary gears 71, the planetary gears 81, and the planetary gears 91 at each counter-output side 'L2', respectively; in such a way that each unit has a completed structure. Accordingly, at a time of assembling the tubular motor 1, the third planetary gear unit 9, the second planetary gear unit 8, and the first planetary gear unit 7 are mounted inside the cylindrical member 65, in this order from a counter-output side 'L2'; and then a counter-output side end section 67 of the cylindrical member 65 is connected to the output side end plate section 55 of the motor unit 5, so that the motor unit 5 and the speed-reducer unit 6 can be connected.

Under a situation as described above, the first planetary gear unit 7 is immediately adjacent to the output side end plate section 55 at an output side 'L1'; and there exists no gear cover and the like, between the first planetary gear unit 7 and the output side end plate section 55.

Under the situation as described above, the counter-output side end section 67 of the cylindrical member 65 directly contacts the output side end plate section 55 of the motor unit 5. In the present embodiment, at the counter-output side end section 67 of the cylindrical member 65, there is circularly formed a step part 670, where an inner diameter of a section located at a counter-output side 'L2' is larger than an inner diameter of the third tubular part 653 having the internal gear 70 formed. Therefore, at the step part 670, a first part 671 facing a counter-output side 'L2' contacts an outer circumferential ring convex part 568 of the output side end plate section 55 from an output side 'L1'; and moreover at the step part 670, a second part 672 facing inside in a radial direction contacts the outer circumferential ring convex part 568 of the output side end plate section 55 from an outside in a radial direction.

Under the situation as described above, between the first planetary gear unit 7 and the output side end plate section 55, there is formed the concave part 569 recessed toward a counter-output side 'L2', in the output side end surface 556 of the output side end plate section 55. Therefore, even when grease, applied to the first planetary gear unit 7 and so forth, leaks out of the first planetary gear unit 7 toward the counter-output side 'L2', the leaked grease is collected in the concave part 569. Accordingly, the grease is not likely to flow into a side of the motor unit 5. Then, an overheating problem and the like, attributable to the grease, is not likely to happen in the motor unit 5. Moreover, the grease is not likely to flow down from the motor unit 5 further to the brake unit 4, so that a malfunction and the like of brake operation owing to the grease is less likely to happen. Furthermore, at the output side end plate section 55, a space between the inner circumferential ring convex part 567 and the outer circumferential ring convex part 568 makes up the concave part 569 being annular, so that the grease is unlikely to leak out of both the inner side and the outer side in the radial direction of the output side end plate section 55. Furthermore, in the counter-output end section 67 of the cylindrical member 65, at the step part 670, the first part 671 facing a counter-output side 'L2' contacts the outer circumferential ring convex part 568 of the output side end plate section 55 from an output side 'L1'; and moreover at the step part 670, the second part 672 facing inside in the radial direction contacts the outer circumferential ring convex part 568 of the output side end plate section 55 from an outside in the radial direction. Accordingly, the grease is unlikely to leak out through a clearance between the output side end plate section 55 and the cylindrical member 65.

Primary Advantageous Effect of the Present Embodiment

As explained above, in the tubular motor 1 according to the present embodiment, the planetary carrier 75 of the first planetary gear unit 7 is provided with the supporting plate 79 that overlaps with the planetary gears 71 at the counter-output side 'L2' in order to support the planetary gears 71 from the counter-output side 'L2'. Therefore, the first planetary gear unit 7 is independent as the first planetary gear unit itself, so that it is not needed to support the planetary gears 71 by use of the output side end plate section 55 and the like of the motor unit 5. Accordingly, the tubular motor 1 can be assembled efficiently. Moreover, the planetary carrier 75 of the first planetary gear unit 7 is provided with the supporting plate 79 that overlaps with the planetary gears 71 at the counter-output side 'L2' in order to support the planetary gears 71 from the counter-output side 'L2', and therefore even when the output side end surface 556 of the output side end plate section 55 is provided with the concave part 569 into which the grease flows, it is not needed to provide a gear cover and the like for supporting the planetary gears 71 at a counter-output side 'L2'. Accordingly, the number of components for the tubular motor 1 can be reduced, and moreover the tubular motor 1 can be assembled efficiently.

Furthermore, the first planetary gear unit 7 is provided with the cylindrical member 65 where the internal gear 70 is formed on the internal surface 68, and the counter-output side end section 67 of the cylindrical member 65 contacts the output side end plate section 55 of the motor unit 5. Therefore, the first planetary gear unit 7 and the motor unit 5 can easily be connected so that the tubular motor 1 can be assembled efficiently. Moreover, since the cylindrical member 65 of the first planetary gear unit 7 and the output side end plate section 55 of the motor unit 5 are directly connected, coaxiality between the cylindrical member 65 and the output side end plate section 55 can be improved. Therefore, coaxiality between the first planetary gear unit 7 and the motor unit 5 can be improved. Furthermore, since the cylindrical member 65 is used as a common internal gear forming component for the first planetary gear unit 7, the second planetary gear unit 8, and the third planetary gear unit 9; coaxiality among the first planetary gear unit 7, the second planetary gear unit 8, and the third planetary gear unit 9 can be improved, and moreover coaxiality between an entire section of the speed-reducer unit 6 and the motor unit 5 can be improved.

Furthermore, the inner diameters of the cylindrical member 65 become larger step by step from the output side 'L1' toward the counter-output side 'L2' so that the third planetary gear unit 9, the second planetary gear unit 8, and the first planetary gear unit 7 can easily be mounted inside the cylindrical member 65 in this order. Moreover, the internal gear 70, the internal gear 80, and the internal gear 90 can easily be formed on the internal surface 68 of the cylindrical member 65. Moreover, since all of the internal gear 70 of the first planetary gear unit 7, the internal gear 80 of the second planetary gear unit 8, and the internal gear 90 of the third planetary gear unit 9 are formed on the internal surface 68 of the cylindrical member 65; the number of components can be reduced, and the tubular motor 1 can be assembled efficiently.

Furthermore, all of the first planetary gear unit 7, the second planetary gear unit 8, and the third planetary gear unit 9 are provided with the supporting plate 79, the supporting plate 89, and the supporting plate 99, for supporting the planetary gears 71, the planetary gears 81, and the planetary gears 91, from a counter-output side 'L2', respectively; the tubular motor 1 can be assembled efficiently.

Another Embodiment

Although at least an embodiment of the present invention is applied to the tubular motor 1 having three planetary gear units in the embodiment described above, at least an embodiment of the present invention may be applied to another tubular motor 1 having two planetary gear units (the first planetary gear unit 7 and the second planetary gear unit 8), or still another tubular motor 1 having a planetary gear unit (the first planetary gear unit 7).

At least an embodiment of the present invention is explained below with reference to FIGS. 7A-7B through FIGS. 11A-11B.

A control method for a brushless motor, to which at least an embodiment of the present invention is applied, is explained below with reference to the drawings. Incidentally, in the following explanation, an explanation is made with a focus on a control method for a brushless motor used as a drive source for an electric shutter device.

(Structure of an Electric Shutter Device)

Figure 7A:
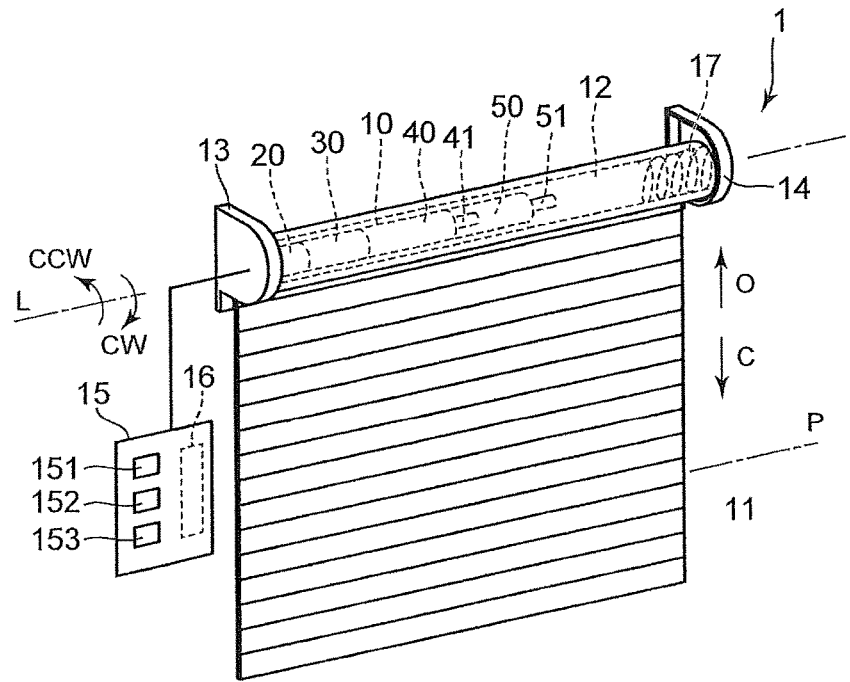
FIG. 7 includes explanatory drawings of a tubular motor to which at least an embodiment of the present invention is applied.
Figure 7B:
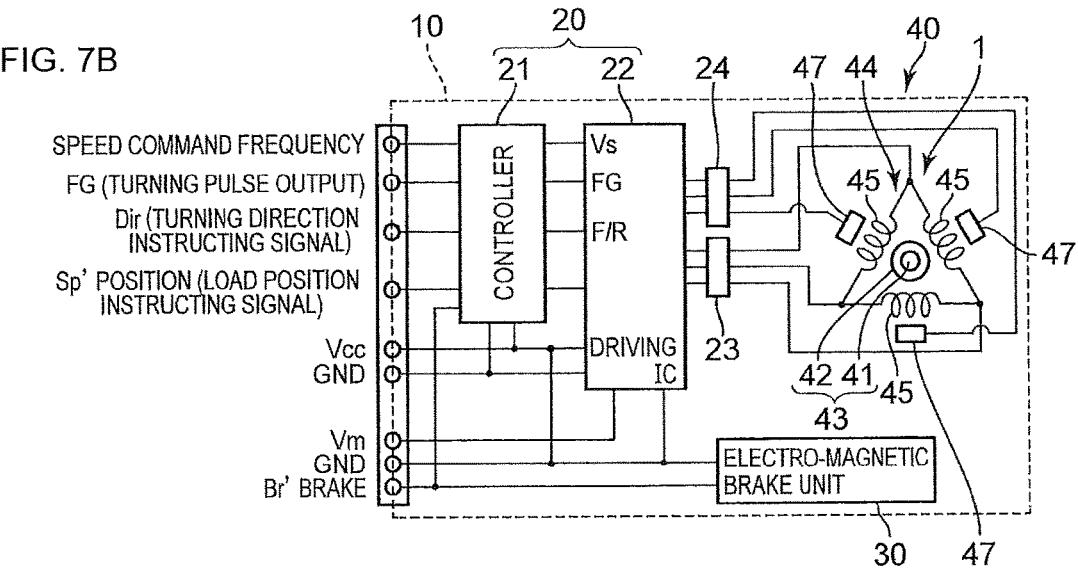

FIGS. 7A-7B include explanatory drawings of an electric shutter device to which at least an embodiment of the present invention is applied; wherein FIG. 7A and FIG. 7B are an explanatory drawing schematically showing a structure of the electric shutter device, and a block diagram showing a configuration of a control device for a brushless motor used as a drive source for the electric shutter device, respectively.

As shown in FIG. 7A, an electric shutter device 1 has a tubular turning shaft 12 that winds up a shutter 11, and the turning shaft 12 is fixed to a building and the like, by the intermediary of a bracket 13, and a bracket 14. Moreover, the electric shutter device 1 includes a tubular motor 10 fixed to the building and the like, by the intermediary of the bracket 13, and an operation board 15 to control opening/closing operation of the shutter 11.

In the tubular motor 10; there are placed a drive control unit 20, an electro-magnetic brake unit 30, a brushless motor 40, and a speed-reduction gear unit 50 in this order; and then the drive control unit 20 operates and controls the brushless motor 40. The drive control unit 20 is electrically connected to a control section 16 configured in the operation board 15; and at a time when an operation is carried out at the operation board 15, the drive control unit 20 carries out a drive control in accordance with contents of the operation. Meanwhile, the electro-magnetic brake unit 30 operates, according to a command from the control section 16 configured in the operation board 15.

With regard to the tubular motor 10, an output shaft 51 is connected to the turning shaft 12. Therefore, when a motor shaft 41 of the brushless motor 40 turns, a turning motion of the motor shaft 41 is transmitted to the output shaft 51 by the intermediary of the speed-reduction gear unit 50, so that the turning shaft 12 turns around an axis line 'L'.

In the electric shutter device 1; if an opening button 151 of the operation board 15 is pressed, a signal corresponding to the pressed button is output from the control section 16 to the drive control unit 20, in such a way that the drive control unit 20 turns the motor shaft 41 in one direction. Accordingly, the output shaft 51 and the turning shaft 12 turn clockwise (CW) around the shaft direction 'L', and therefore the shutter 11 is wound up by the turning shaft 12 so as to move in an opening direction 'O'. On the other hand; if a closing button 152 of the operation board 15 is pressed, a signal corresponding to the pressed button is output from the control section 16 to the drive control unit 20, in such a way that the drive control unit 20 turns the motor shaft 41 in the other direction. Accordingly, the output shaft 51 and the turning shaft 12 turn counter-clockwise (CCW) around the shaft direction 'L', and therefore the shutter 11 is unwound out of the turning shaft 12 so as to move in a closing direction 'C'. In the meantime; if a stop button 153 of the operation board 15 is pressed while the shutter 11 is moving in either the opening direction or the closing direction, a signal corresponding to the pressed button is output from the control section 16 to the drive control unit 20, in such a way that the drive control unit 20 stops the turning motion of the motor shaft 41 in order to stop the shutter 11. Meanwhile; if the stop button 153 of the operation board 15 is pressed, the control section 16 operates the electro-magnetic brake unit 30 so as to stop the shutter 11.

Incidentally, an assist spring 17 composed of a coil spring and the like, for generating a biasing force so as to work against the shutter 11's own weight, is connected to the turning shaft 12; and therefore, the turning shaft 12 is biased toward a direction for winding up the shutter 11 (the opening direction 'O'). Accordingly, when the biasing force of the assist spring 17 becomes greater than the shutter 11's own weight in association with a movement of the shutter 11, a load for turning in one direction is applied to the motor shaft 41 of the brushless motor 40. For example, until the shutter 11 reaches a halfway position 'P' in the opening direction 'O', the biasing force of the assist spring 17 is less than or equal to the shutter 11's own weight, so that a load for turning in the one direction is not applied to the motor shaft 41 of the brushless motor 40. Meanwhile, when the shutter 11 moves in the opening direction 'O' further from the halfway position 'P', the biasing force of the assist spring 17 exceeds the shutter 11's own weight, so that the load for turning in the one direction is applied to the motor shaft 41 of the brushless motor 40.

Then, in the following explanation; the explanation is made on the assumption that; the one direction (the direction for driving the shutter 11 in the opening direction 'O') of turning directions of the motor shaft 41, in which the load of the assist spring 17 is applied, is a first direction in at least an embodiment of the present invention; and meanwhile, a direction (of a turning motion in the other direction, i.e., the direction for driving the shutter 11 in the closing direction 'C') opposite to the direction, in which the load of the assist spring 17 is applied, is a second direction in at least an embodiment of the present invention.

(Electrical Configuration of a Drive Control System for the Brushless Motor 40)

As show in FIG. 7B, the brushless motor 40 includes; a rotor 43 having the motor shaft 41 and a rotor magnet 42; a stator 44 having a plurality of drive coils 45; and magnetic sensor elements 47 for creating a position detecting signal (FG signal) corresponding to a turning motion of the rotor magnet 42. In the present embodiment, the stator 44 includes three drive coils 45, corresponding to a phase-U, a phase-V and a phase-W. Moreover, there are provided three magnetic sensor elements 47, corresponding to the phase-U, the phase-V and the phase-W.

Then, the drive control unit 20 includes a controller 21, and a driving IC 22 for driving the brushless motor 40 under a command from the controller 21. The driving IC 22 is electrically connected to the drive coils 45, by the intermediary of a connector 23, in order to supply the drive coils 45 with a drive current. Moreover, the driving IC 22 is electrically connected to the magnetic sensor elements 47, by the intermediary of a connector 24, in order to input a detection result from the magnetic sensor elements 47. The controller 21 and the driving IC 22 are electrically connected with each other, by the intermediary of signal wire. The controller 21 outputs a voltage Vs corresponding to a speed command frequency Tsj, to be described later, a signal F/R for instructing on a turning direction of the rotor 43, and the like, to the driving IC 22. On the other hand, the driving IC 22 outputs the detection result FG from the magnetic sensor elements 47, to the controller 21.

The speed command frequency Tsj corresponding to a turning speed of the rotor 43, which corresponds to a transfer speed of the shutter 11, and a turning direction instructing signal Dir, which instructs on a turning direction of the rotor 43, are output to the drive control unit 20 from the control section 16 shown in FIG. 7A. Moreover, a position signal Sp for instructing on a load position is output to the drive control unit 20 from the control section 16 shown in FIG. 7A. The position signal Sp is information for indicating whether the shutter 11 is located at a position toward the opening direction away from the halfway position 'P', shown in FIG. 7A; and wherein the signal includes information for indicating whether or not the load toward the opening direction 'O' is applied to the shutter 11. Meanwhile, the detection result FG by the magnetic sensor elements 47 is output from the controller 21 to the control section 16.

Moreover, in the tubular motor 10, there are supplied a drive voltage Vcc for the controller 21 and the driving IC 22, a ground potential GND, a motor power source Vm to be used for driving the brushless motor 40, a brake drive voltage Br for controlling the electro-magnetic brake unit 30, and the like, from the control section 16.

Incidentally, the controller 21 includes a CPU and various memory devices; and carries out operation, explained below with reference to FIG. 8 through FIGS. 11A-11B, on the basis of an operation program saved in a memory device.

(Control Method for the Brushless Motor 40)

Figure 8:
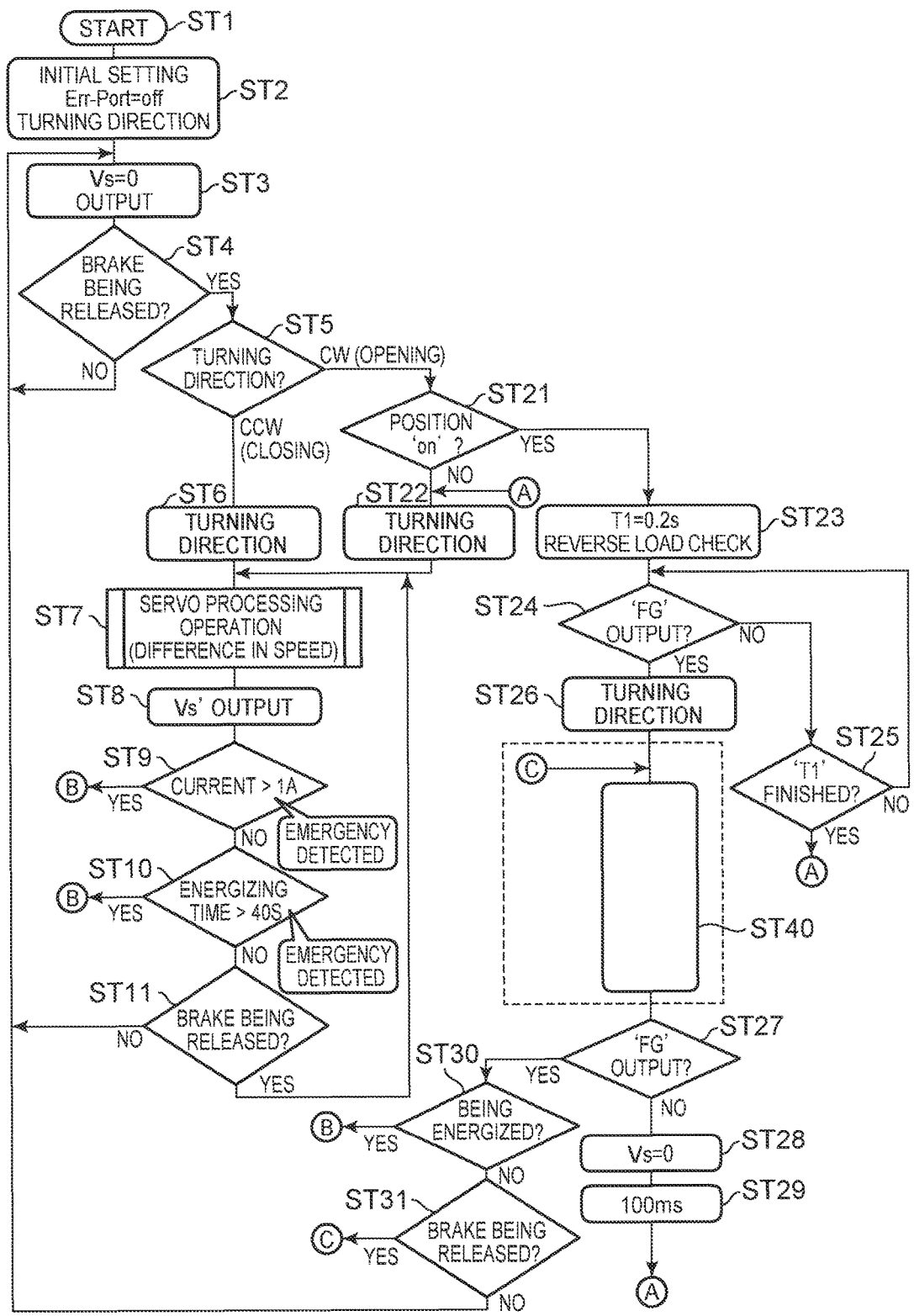
FIG. 8 is a flowchart of a control method for a brushless motor to which at least an embodiment of the present invention is applied.
Figure 9:
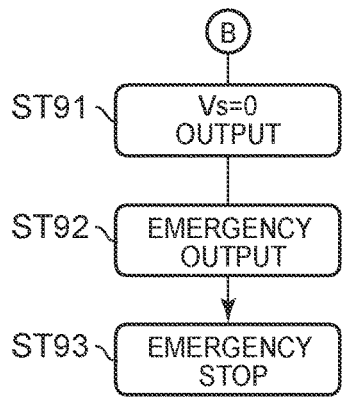
FIG. 9 is a flowchart showing a process at a time when operation finishes in the control method for a brushless motor to which at least an embodiment of the present invention is applied.

FIG. 8 is a flowchart of a control method for the brushless motor 40 to which at least an embodiment of the present invention is applied. FIG. 9 is a flowchart showing a process at a time when operation finishes in the control method for the brushless motor 40 to which at least an embodiment of the present invention is applied.

In the electric shutter device 1 explained with reference to FIGS. 7A-7B; pressing the opening button 151 or the closing button 152 of the operation board 15 invokes a start of operation at Step ST1 shown in FIG. 8; in order to carry out an initial setting that includes turning off an error port (not shown in the drawing), setting a turning direction, and the like, at Step ST2. Next, after setting a speed command voltage Vs to be 0V at Step ST3, it is judged at Step ST4 whether or not the electro-magnetic brake unit 30 is released. Then, if it is judged at Step ST4 that the electro-magnetic brake unit 30 is not released, Step ST3 and Step ST4 are repeated until the electro-magnetic brake unit 30 is released.

If it is judged at Step ST4 that the electro-magnetic brake unit 30 is released, a judgment is made at Step ST5 about whether an instruction on the turning direction is for the opening direction or the closing direction. In the case where the instruction on the turning direction at Step ST5 is for the second direction (the closing direction), a second direction driving process is carried out.

Under this situation; in the case of driving in the second direction, no external load in the second direction is applied to the rotor 43; and therefore, an instruction on the turning direction is output to the driving IC 22, at Step ST6. As a result of that, while executing a servo processing operation that is described later with reference to FIG. 10, the controller 21 drives the brushless motor 40 at Step ST7 in such a way as to turn the rotor 43 in the second direction. The speed command voltage Vs changes at a time of the driving operation; and accordingly, a speed command voltage Vs that has newly been set up is output to the driving IC 22, at Step ST8. As a result, the rotor 43 in the brushless motor 40 turns in the second direction.

Then, it is judged at Step ST9 whether or not the drive current exceeds 1 A. In the case where it is judged that the drive current exceeds 1 A, the driving operation is interrupted by way of an emergency stop process shown in FIG. 9. In other words; in the emergency stop process shown in FIG. 9, at first the speed command voltage Vs is set to be 0V at Step ST91, and then the error port (not shown in the drawing) is turned on at Step ST92, so as to output information, for notifying that an error has happened, to the control section 16, and execute the emergency stop process at Step ST93.

In the case where it is judged at Step ST9 that the drive current does not exceed 1 A, a judgment is made at Step ST10 on whether or not an energizing time exceeds 40 seconds. If it is judged at Step ST10 that the energizing time exceeds 40 seconds, the emergency stop process shown in FIG. 9 is carried out. On the other hand, if it is judged at Step ST10 that the energizing time does not exceed 40 seconds, a judgment is made at Step ST11 on whether or not the electro-magnetic brake unit 30 is under conditions of being released. If it is judged at Step ST11 that the electro-magnetic brake unit 30 is under conditions of being released, operation returns to Step ST7 again to carry out the step described above. On the other hand, if it is judged at Step ST11 that the electro-magnetic brake unit 30 is under conditions of being not released (i.e., the electro-magnetic brake unit 30 is in operation), driving the shutter 11 finishes; and operation returns to Step ST3 in order to stand by until the opening button 151 or the closing button 152 of the operation board 15 is pressed.

(First Direction Driving Process)

In the case where the instruction on the turning direction at Step ST5 is for the second direction (the closing direction), a first direction driving process is carried out. Under this situation; in the case of driving in the first direction, sometimes an external load in the first direction may be applied to the rotor 43; and therefore, it is checked at Step ST21 with reference to the position signal Sp whether or not the shutter 11 is located at a position where the external load in the first direction is applied to the rotor 43. If it is judged at Step ST21 that the shutter 11 is not located at a position where the external load in the first direction is applied to the rotor 43, a signal notifying that the turning direction is for the first direction is output to the driving IC 22 at Step ST22, and subsequently a servo processing operation gets started at Step ST7.

On the other hand, if it is judged that the shutter 11 is located at a position where the external load in the first direction is applied to the rotor 43, a turning detection process is carried out in order to detect a turn of the rotor 43 in 0.2 seconds, at Step ST23, with no start of driving for the first direction. The turning detection process is carried out on the basis of a fact whether or not a frequency of the signal FG, output from the magnetic sensor elements 47, is less than 20 Hz (threshold), at Step ST24. In the case where the frequency of the signal FG, output from the magnetic sensor elements 47, is less than 20 Hz (threshold) at Step ST24, it is determined that the external load is not making the rotor 43 turn. Then, operation is interrupted for a standby time of 0.2 seconds at Step ST25, and the signal notifying that the turning direction is for the first direction is output to the driving IC 22 at Step ST22, and subsequently the servo processing operation gets started at Step ST7.

On the other hand, if the frequency of the signal FG, output from the magnetic sensor elements 47, is equal to or higher than 20 Hz (threshold) at Step ST24, it is determined that the external load is making the rotor 43 turn in the first direction. Then, at Step ST40, a braking force is applied to the rotor 43; and subsequently a specified speed command voltage Vs is output to the driving IC 22, and driving the rotor 43 gets started.

In the present embodiment, a braking force is applied by way of short-circuiting terminals of at least one drive coil out of the three drive coils 45 corresponding to the phase-U, the phase-V and the phase-W, as described later with reference to FIGS. 11A-11B. At the time, terminals of two drive coils out of the three drive coils 45 may be short-circuited, and terminals of all the drive coils of three drive coils 45 may be short-circuited as well. In any one of those cases described above, there can be generated the braking force acting against a torque with which the external load turns the rotor 43 in the first direction. Incidentally, if the number of the drive coils 45 to be short-circuited is appropriately set according to the shutter 11's own weight, the biasing force of the assist spring 17, and power of the tubular motor 10; it becomes possible to adequately have the braking force acting against a torque with which the external load turns the rotor 43 in the first direction.

After the braking force is applied in this way, it is judged at Step ST27 whether or not a frequency of the signal FG, output from the magnetic sensor elements 47, is less than 20 Hz. If it is judged at Step ST27 that the frequency of the signal FG, output from the magnetic sensor elements 47, is less than 20 Hz, it is determined that the external load is not making the rotor 43 turn because of the braking force applied. Then, after setting the speed command voltage Vs to be to be 0V at Step ST28, operation stands by for 100 milliseconds at Step 29; and then the signal notifying that the turning direction is for the first direction is output to the driving IC 22 at Step ST22, and subsequently the servo processing operation gets started at Step ST7.

On the other hand, if it is judged that the frequency of the signal FG, output from the magnetic sensor elements 47, is equal to or higher than 20 Hz at Step ST27, a judgment is made at Step ST30 on whether or not the device is being energized at the time. In the case of being energized, the emergency stop process shown in FIG. 9 is carried out. Meanwhile, if it is judged at Step ST30 that the device is not being energized, a judgment is made at Step ST31 on whether or not that the electro-magnetic brake unit 30 is being released.

If it is judged at Step ST31 that the electro-magnetic brake unit 30 is being released, a braking force is applied again to the rotor 43 at Step ST40. On the other hand, if it is judged at Step ST31 that the electro-magnetic brake unit 30 is not being released, driving the shutter 11 finishes; and operation returns to Step ST3 in order to stand by until the opening button 151 or the closing button 152 of the operation board 15 is pressed.

(Servo Control for the Brushless Motor 40)

Figure 10:
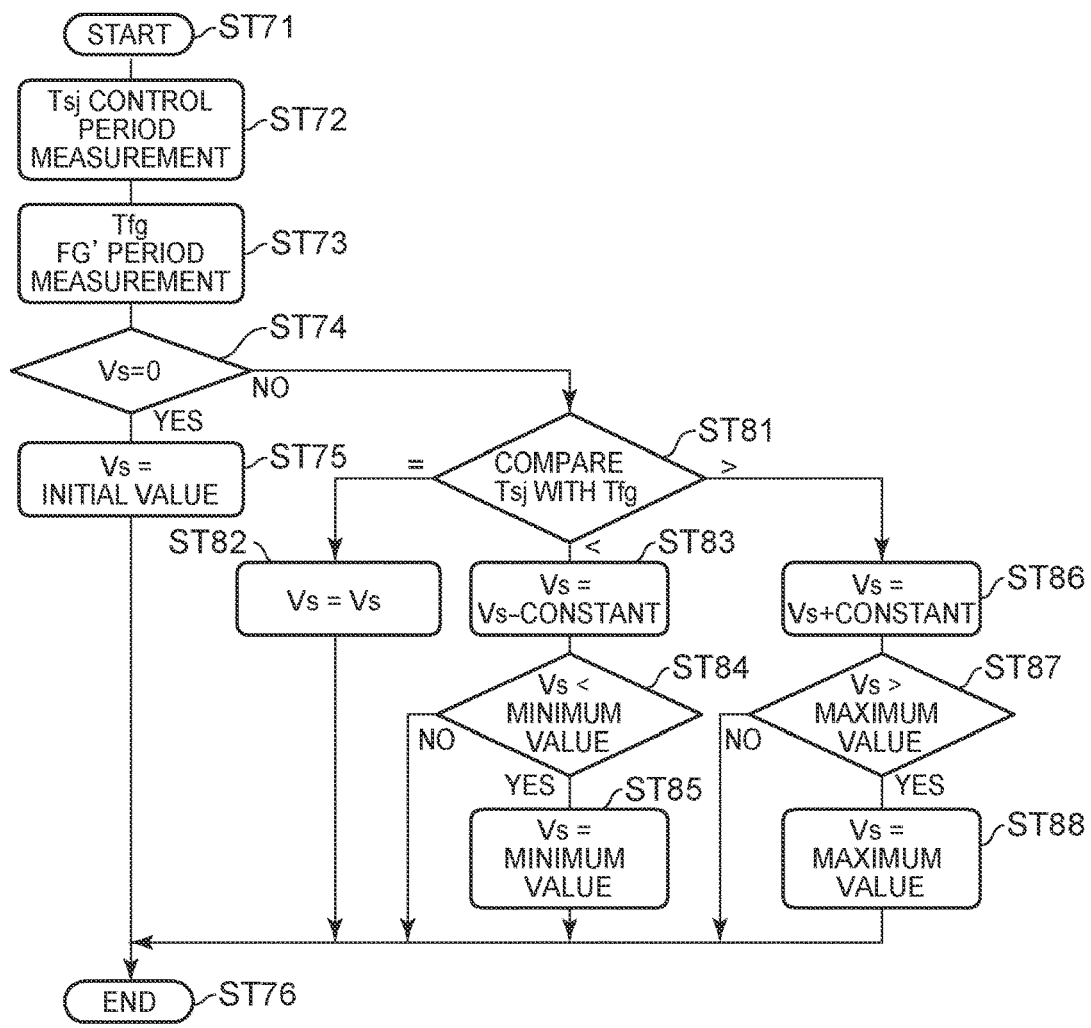
FIG. 10 is a flowchart of a process at a time of controlling a turning speed of the brushless motor in the control method for the brushless motor to which at least an embodiment of the present invention is applied.

FIG. 10 is a flowchart showing a process at a time of controlling a turning speed of the brushless motor 40 in the control method for the brushless motor 40 to which at least an embodiment of the present invention is applied.

At Step ST7 shown in FIG. 8, in order to control a turning speed of the rotor 43; as shown in FIG. 10, after starting the process at Step ST71, period measurement is carried out first at Step ST72 in order to obtain a speed command frequency Tsj; and subsequently at Step ST73, a frequency Tfg is obtained as a result of the period measurement with respect to the signal FG, output from the magnetic sensor elements 47. Then, it is judged at Step ST74 whether or not the speed command voltage Vs is 0V. In the case where it is judged at Step ST74 that the speed command voltage Vs is 0V, the speed command voltage Vs is set with an initial value at Step ST75. Then, operation finishes at Step ST76.

On the other hand, if it is judged at Step ST74 that the speed command voltage Vs is not 0V a comparison is made at Step ST81 between the speed command frequency Tsj and the frequency Tfg of the signal FG.

In the case where the speed command frequency Tsj and the frequency Tfg of the signal FG are equal to each other at Step ST81; while keeping the speed command voltage Vs as it is at the time at Step ST 82, operation finishes at Step ST76.

In the case where the frequency Tfg of the signal FG is higher than the speed command frequency Tsj at Step ST 81, a predetermined constant is subtracted from the speed command voltage Vs at Step ST 83, and then a judgment is made at Step ST 84 about whether or not the changed speed command voltage Vs is less than a minimum value. In the case of the voltage being less than the minimum value, while setting the speed command voltage Vs with the minimum value at Step ST 85, operation finishes at Step ST76. On the other hand, if it is judged at Step ST 84 that the changed speed command voltage Vs is not less than the minimum value, operation finishes at Step ST76.

In the case where the frequency Tfg of the signal FG is lower than the speed command frequency Tsj at Step ST 81, a predetermined constant is added to the speed command voltage Vs at Step ST 86, and then a judgment is made at Step ST 87 about whether or not the changed speed command voltage Vs exceeds a minimum value. In the case of the voltage exceeding the maximum value, while setting the speed command voltage Vs with the maximum value, at Step ST 88, operation finishes at Step ST76. On the other hand, if it is judged at Step ST 87 that the changed speed command voltage Vs does not exceed the maximum value, operation finishes at Step ST76.

(Setting Method of a Braking Force)

Figure 11A:
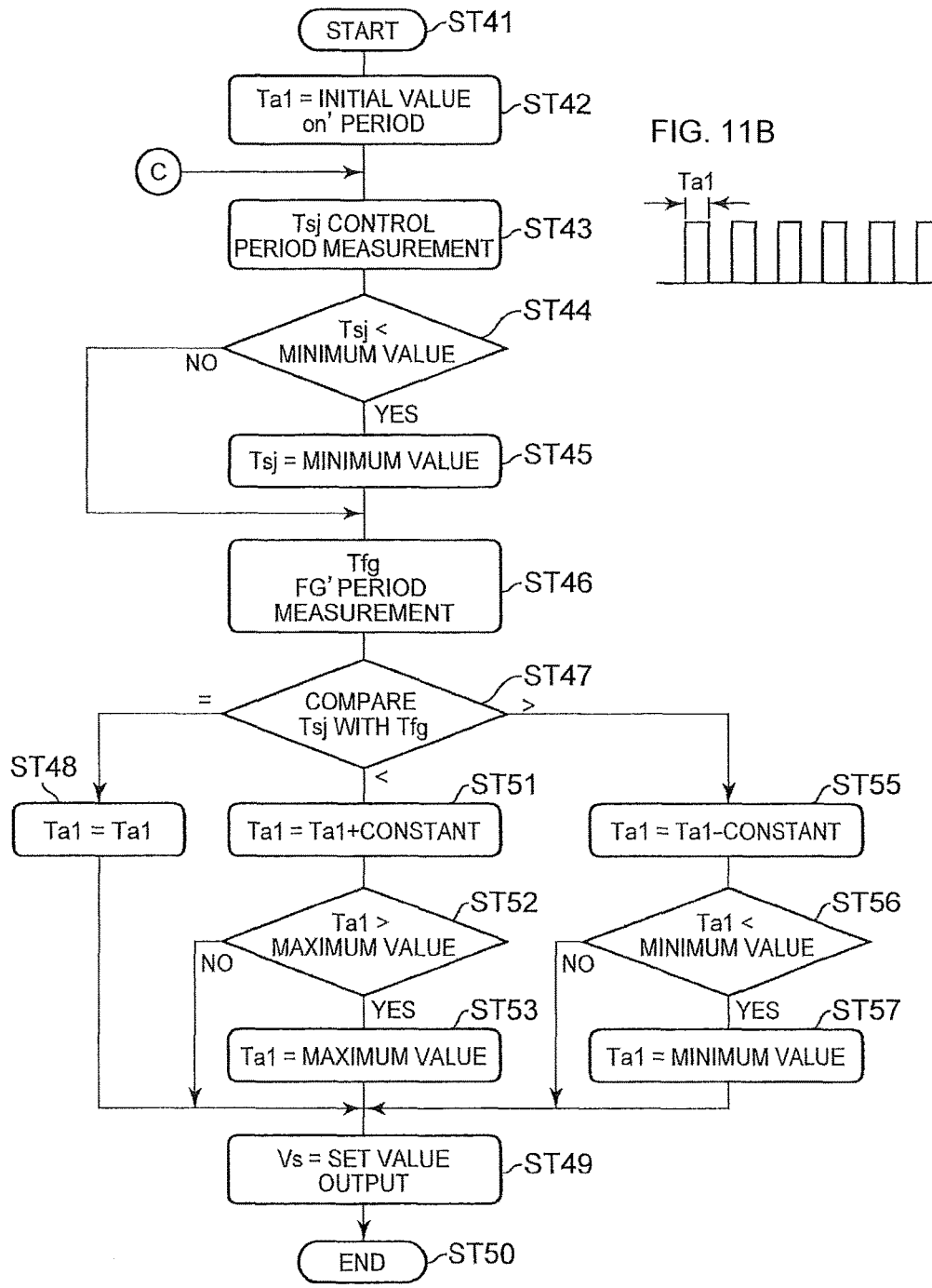
FIGS. 11A to 11B include explanatory drawings of a setting method for setting a braking force to be applied to a rotor in the control method for a brushless motor to which at least an embodiment of the present invention is applied.
Figure 11B:
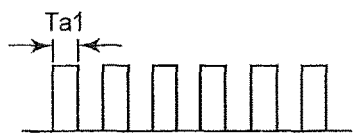

FIGS. 11A-11B include explanatory drawings of a setting method for setting a braking force to be applied to the rotor 43 in the control method for the brushless motor 40 to which at least an embodiment of the present invention is applied; wherein FIG. 11A and FIG. 11B are a flowchart showing a process of setting a braking force, and an explanatory drawing of a period for which the braking force is applied, respectively.

At a time of applying a braking force to the rotor 43 at Step ST40 shown in FIG. 8; in the present embodiment, terminals of at least one drive coil out of the three drive coils 45 corresponding to the phase-U, the phase-V and the phase-W, are short-circuited. At the time, terminals of two drive coils out of the three drive coils 45 may be short-circuited, and terminals of all the drive coils of three drive coils 45 may be short-circuited as well. In any one of those cases described above; according to the present embodiment, the braking force is adjusted, as shown in FIG. 11B, by way of applying the braking force intermittently with a constant cycle, and changing an applying period (application period) Ta1.

In the present embodiment; as shown in FIG. 11A, after starting a process at Step ST41, the application period Ta1 is set with an initial value at Step ST41. Then, period measurement is carried out at Step ST43 in order to obtain a speed command frequency Tsj; and subsequently at Step ST44, a judgment is made at Step ST44 about whether or not the speed command frequency Tsj is less than a minimum value. In the case where it is judged_that the speed command frequency Tsj is less than the minimum value, the speed command frequency Tsj is set with the minimum value at Step ST45. On the other hand, if it is judged that the speed command frequency Tsj is not less than the minimum value, the speed command frequency Tsj is kept as it is at the time. Then, at Step ST46, a frequency Tfg is obtained as a result of the period measurement with respect to the signal FG, output from the magnetic sensor elements 47.

Next, at Step ST47, a comparison is made between the speed command frequency Tsj and the frequency Tfg of the signal FG.

In the case where the speed command frequency Tsj and the frequency Tfg of the signal FG are equal to each other at Step ST47; while keeping the application period Ta1 as it is at the time at Step ST 48, the speed command voltage Vs is output at Step ST49, and subsequently operation finishes at Step ST50.

In the case where the frequency Tfg of the signal FG is higher than the speed command frequency Tsj at Step ST 47, the application period Ta1 is extended by a predetermined constant at Step ST 51. Then, a judgment is made at Step ST 52 about whether or not the changed application period Ta1 exceeds a maximum value. In the case of the changed application period Ta1 exceeding the maximum value, the application period Ta1 is set with the maximum value at Step ST53; and meanwhile, in the case of the changed application period Ta1 not exceeding the maximum value, the application period Ta1 is kept as it is at the time. Then, the speed command voltage Vs is output at Step ST49, and subsequently operation finishes at Step ST50.

In the case where the frequency Tfg of the signal FG is lower than the speed command frequency Tsj at Step ST 47, the application period Ta1 is shortened by a predetermined constant at Step ST 55. Then, a judgment is made at Step ST 56 about whether or not the changed application period Ta1 is shorter than a minimum value. In the case where it is judged that the changed application period Ta1 is shorter than the minimum value, the application period Ta1 is set with the minimum value at Step ST57; and meanwhile, in the case of the changed application period Ta1 being not shorter than the minimum value, the application period Ta1 is kept as it is at the time. Then, the speed command voltage Vs is output at Step ST49, and subsequently operation finishes at Step ST50.

Primary Advantageous Effect of the Present Embodiment

According to the present embodiment as explained above; at a time of driving the rotor 43 to turn in the first direction, wherein the load for turning in the first direction being externally applied to the rotor 43; the turning detection process is carried out in order to detect a turn of the rotor 43 before starting to supply the drive coils 45 with electricity; and in the case where the turning speed of the rotor 43 is equal to or higher than the threshold, the braking force is applied to the rotor. Therefore, it is possible to inhibit the rotor 43 from turning at a speed higher than a target speed. Moreover, the magnetic sensor elements 47 for creating a position detecting signal are used in the turning detection process, and therefore it is not needed to provide a_position sensor such as an encoder, and a rotation sensor such as a tacho-generator. Accordingly, a cost reduction can be implemented.

Furthermore, in the present embodiment; the braking force is generated by way of short-circuiting both terminals of at least one drive coil 45 out of the plurality of drive coils 45. Accordingly, there is an advantage of generating the braking force by way of controlling energization for the drive coils 45.

Moreover, in the present embodiment; at the time of applying the braking force to the rotor 43, a comparison is made between a commanded speed for driving the rotor 43 to turn in the first direction, and a turning speed of the rotor 43 detected by the magnetic sensor elements 47; for changing an amplitude of the braking force, on the basis of the comparison result between the commanded speed and the turning speed. Therefore, an appropriate braking force can be applied to the rotor 43.

On the other hand, in the second direction driving process for driving the rotor 43 to turn in the second direction, being opposite to the first direction; without the turning detection process, the plurality of drive coils 45 are supplied with a drive current for driving the rotor 43 to turn in the second direction. Therefore, the number of operation steps can be reduced so that a load on controlling operation can be lessened.

Moreover, in the present embodiment; after supplying the plurality of drive coils 45 with a drive current, a turn of the rotor 43 is detected on the basis of the detection result by the magnetic sensor elements 47. Then, if the turning speed of the rotor 43 is lower than a specified speed value, the drive current is increased; and in the meantime, if the turning speed of the rotor 43 is lower than a specified speed value, the drive current is decreased. In this way, an actual turning speed can be fed back for the drive current, so that it is possible to make the turning speed of the rotor 43 closer to the specified speed value.

Moreover, in the present embodiment; the rotor 43 is connected to the turning shaft 12 for winding the shutter, by the intermediary of the speed-reduction gear unit 50 (a series of speed-reduction gears), in the electric shutter device 1. In the case of such a configuration; the shutter 11's own weight and the biasing force of the assist spring 17 (a biasing member) connected to the turning shaft (a winding shaft) for winding the shutter are applied to the rotor 43, as an external load to turn the rotor 43 in the first direction. Even in that case, it is still possible to inhibit the rotor 43 from turning at a speed higher than a target speed.

Other Embodiments

Although the braking force is generated by way of short-circuiting both terminals of the drive coils 45 in the embodiment described above, the braking force may be applied by making use of the electro-magnetic brake unit 30.

Although at least an embodiment of the present invention is applied to the electric shutter device 1, in which the biasing force of the assist spring 17 (the biasing member) is applied as the external load to turn the rotor 43 in the first direction, in the embodiment described above, at least an embodiment of the present invention may be applied to an electric shutter device 1, in which the shutter 11's own weight is applied as an external load to turn the rotor 43 in the first direction. In such a case, the first direction is a direction to close the shutter 11.

At least an embodiment of the present invention is explained below with reference to FIGS. 12A-12C through FIGS. 17A-17B.

A motor equipped with a brake, to which at least an embodiment of the present invention is applied, is explained below with reference to the drawings. In the following explanation, while a motor axis line being provided with a symbol 'L'; a symbol 'L1' is provided to an output side where an output shaft protrudes, and a symbol 'L2' is provided to a counter side (a counter-output side) which is opposite to the side where the output shaft protrudes.
(General Structure)

Figure 12A:
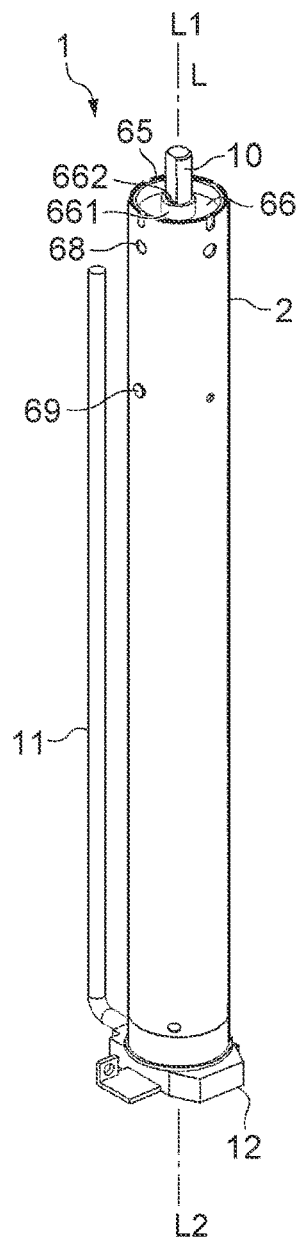
FIGS. 12A through 12C are explanatory drawings of a motor equipped with a brake, to which at least an embodiment of the present invention is applied.
Figure 12B:
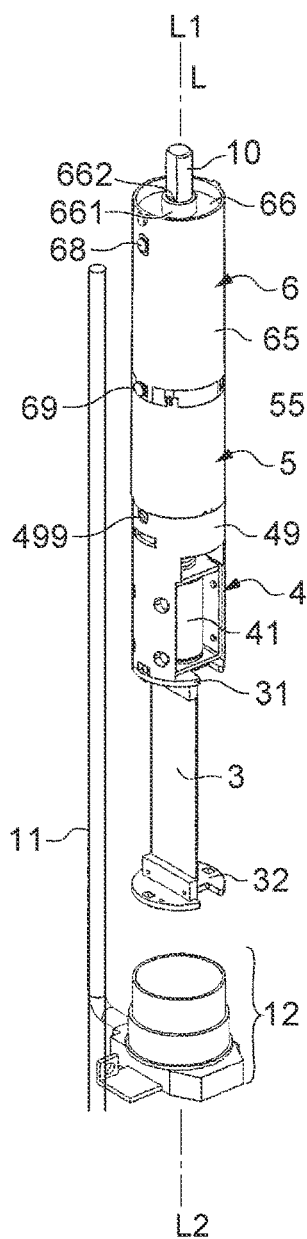
Figure 12C:
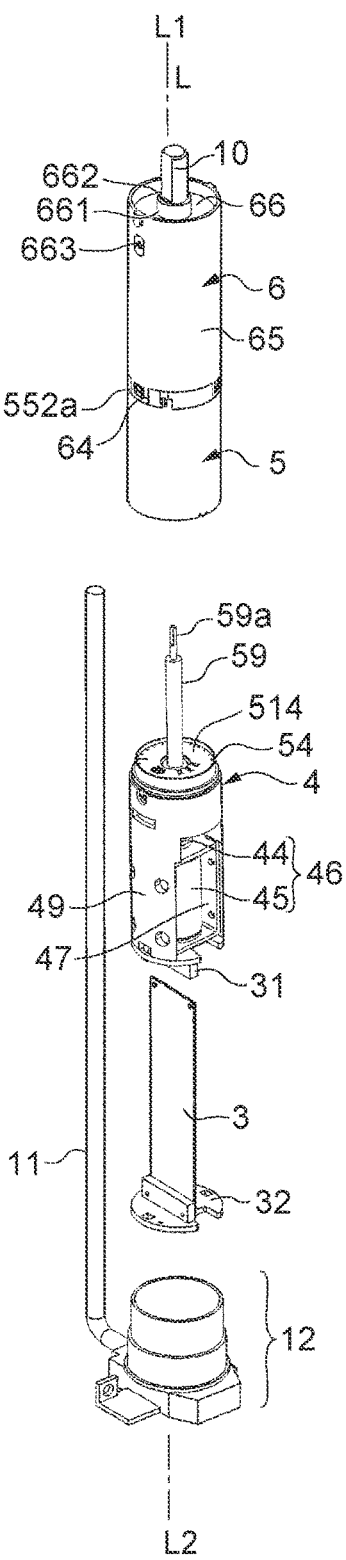

FIGS. 12A-12C include explanatory drawings of a motor equipped with a brake 1, to which at least an embodiment of the present invention is applied; wherein FIG. 12A, FIG. 12B, and FIG. 12C are; a perspective view of the motor equipped with a brake 1, a perspective view showing conditions under which a case 2 is removed from the motor equipped with a brake 1, and an exploded perspective view of units housed inside the case 2, respectively. FIGS. 13A-13C includes cross-sectional drawings of the motor equipped with a brake 1, to which at least an embodiment of the present invention is applied; wherein FIG. 13A, FIG. 13B and FIG. 13C are; a general cross-sectional drawing of the motor equipped with a brake 1, a cross-sectional drawing of a brake unit in a magnified view, and a cross-sectional drawing of a key part of the brake unit in a magnified view.

The motor equipped with a brake 1, shown in FIGS. 12 A-12C and FIGS. 13A-13C, is a tubular motor to be used for a purpose, such as winding a curtain-like article; e.g., a shutter, a shading screen, and the like; and the motor equipped with a brake 1 includes the case 2 being tubular, which stretches in a motor shaft direction 'L'. Inside the case 2, there are placed in a direction from the counter-output side 'L2' toward the output side 'L1'; a circuit board 3, a brake unit 4 (brake section), a motor unit 5 (motor section), and a speed-reducer unit 6 (speed-reducer section), in this order; wherein an output shaft 10 protrudes from the speed-reducer unit 6 toward the output side 'L1'. A board holder 31 and a board holder 32 are placed at an end part of an output side 'L1' and an end part of a counter-output side 'L2' of the circuit board 3, respectively; and then the circuit board 3 is held by the case 2, through the intermediary of the board holder 31 and the board holder 32. At an end part of the counter-output side 'L2' of the case 2, there is provided a connector 12 in order to connect the circuit board 3 and wiring 11; and in the meantime, the connector 12 and the circuit board 3 are connected with lead wire (not illustrated) and the like. The brake unit 4 is composed of a friction-type brake unit, as described later. In the case where the motor equipped with a brake 1 is employed for an electric shutter device, the brake unit 4 makes the shutter stop at a predetermined position, while acting against the shutter's own weight.
(Structure of the Motor Unit 5)

Figure 14:
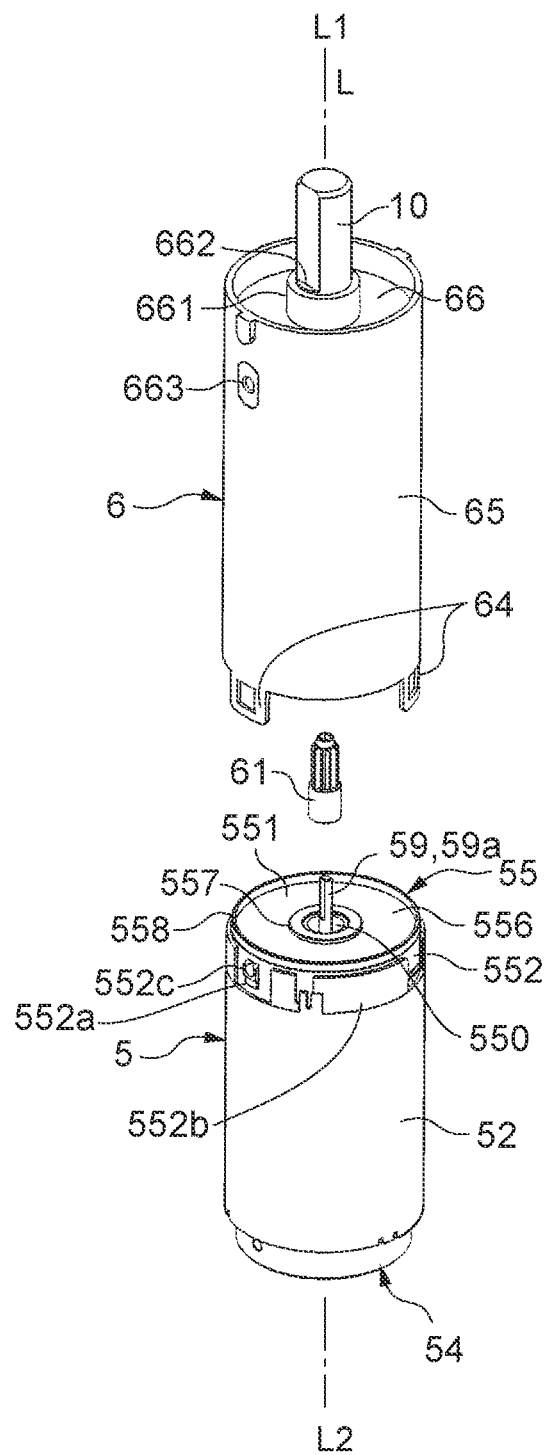
FIG. 14 is a perspective view showing an external appearance of a motor unit and a speed-reducer unit of the motor equipped with a brake, to which at least an embodiment of the present invention is applied.

FIG. 14 is a perspective view showing an external appearance of the motor unit 5 and the speed-reducer unit 6 of the motor equipped with a brake 1, to which at least an embodiment of the present invention is applied. FIGS. 15A-15B include explanatory drawings of the motor unit 5 employed in the motor equipped with a brake 1, to which at least an embodiment of the present invention is applied; wherein FIG. 15A and FIG. 15B are an exploded perspective view of a stator and the like, and a perspective view of a rotor and the like, respectively.

As shown in FIG. 13A and FIG. 3, the motor unit 5 and the speed-reducer unit 6 are placed coaxially, in such a way that a motor shaft 59 protruding from the motor unit 5 toward the output side 'L1' is fitted with an output gear 61 (refer to FIG. 14) for output to the speed-reducer unit 6.

As shown in FIG. 15A, a stator 51 in the motor unit 5 includes a plurality of cores 511 placed in a circumferential direction, insulators 512 covering both ends of the cores 511, and motor coils 513 wound on the cores 511 by the intermediary of the insulators 512; wherein the plurality of cores 511 are held by a core holder 52 being cylindrical. In the meantime, a motor circuit board 514 is held at an end surface of the counter-output side 'L2' of the stator 51.

As shown in FIG. 15B, a rotor 53 in the motor unit 5 includes; the motor shaft 59 that stretches in the motor shaft direction 'L'; a yoke 531 being cylindrical, fixed on an outer circumferential surface of the motor shaft 59; and a magnet 532 being cylindrical, fixed on an outer circumferential surface of the yoke 531. In the motor shaft 59, an output side shaft part 59a protruding toward the output side 'L1' is fitted with the with the output gear 61; and in the meantime, a counter-output side shaft part 59b protruding toward the counter-output side 'L2' is connected to the brake unit 4 to be described later.

In the motor unit 5; a bearing holder 54 of a counter-output side 'L2', which supports the rotor 53 so as to be rotatable, is placed at a counter-output side 'L2' of the rotor 53; and meanwhile, a bearing holder 55 of a output side 'L1', which supports the rotor 53 so as to be rotatable, is placed at an output side 'L1' of the rotor 53.

The bearing holder 54 includes; a disc part 541 in which a shaft hole 540 is formed at a center position, a cylindrical part 542 stretching from an outer rim of the disc part 541 toward an output side 'L1', and a convex part 543 like a rib, protruding outward in a radial direction at a center of an outer circumference surface of the disc part 541 in the motor shaft direction 'L'; wherein the convex part 543 is formed around an entire circumference of the disc part 541. The shaft hole 540 is a stepped hole having a step part toward an output side 'L1'; in the shaft hole 540, there is held an annular bearing 56 that supports the counter-output side shaft part 59b of the motor shaft 59 so as to be rotatable. The bearing 56 is materialized with an oil-impregnated sintered bearing and the like.

The bearing holder 55 includes; a disc part 551 in which a shaft hole 550 is formed at a center position, and a cylindrical part 552 stretching from an outer rim of the disc part 551 toward a counter-output side 'L2'. The shaft hole 550 is a stepped hole having a step part toward a counter-output side 'L2'; in the shaft hole 550, there is held an annular bearing 57 that supports the output side shaft part 59a of the motor shaft 59 so as to be rotatable. The bearing 57 is materialized with an oil-impregnated sintered bearing and the like. At an output side end surface 556 of the disc part 551, there is formed an annular inner circumferential ring convex part 557 protruding toward the output side 'L1' at an inner side in a radial direction, and there opens the shaft hole 550 at an inner side of the inner circumferential ring convex part 557. Moreover, at the output side end surface 556 of the disc part 551, there is formed an annular outer circumferential ring convex part 558 protruding toward the output side 'L1', being positioned at an inner side of an outer rim of the disc part 551 in the radial direction.

In the bearing holder 55; on an outer circumferential surface of the disc part 551, there are formed engaging convex parts 552a and 552b protruding in an outer radial direction. Therefore, at a time when the cylindrical part 552 of the bearing holder 55 is fitted into an inner side of the core holder 52 shown in FIG. 15A, an output side end part 521 of the core holder 52 contacts with the engaging convex part 552b. Moreover, at an inner circumferential surface of the core holder 52, there is formed a step part 523 where an inner diameter of the output side end part 521 is larger than an inner diameter of a section 522, which is positioned closer to the counter-output side 'L2' than the output side end part 521 is. On the other hand, at an outer circumferential surface of the cylindrical part 552 of the bearing holder 55, there is formed a step part 555 where an outer diameter of a counter-output side end part 553, positioned at an end part of a counter-output side 'L2', is small. Therefore, at a time when the cylindrical part 552 of the bearing holder 55 is fitted into an inner side of the core holder 52, the output side end part 521 of the core holder 52 overlaps with the counter-output side end part 553 of the bearing holder 55 from an outside in a radial direction, so as to set up a location of the bearing holder 55 in relation to the core holder 52.

(Structure of the Speed-Reducer Unit 6 and the Like)

As shown in FIG. 13A, in the speed-reducer unit 6; there are placed the first planetary gear unit 7, the second planetary gear unit 8, and the third planetary gear unit 9, in this order from a counter-output side 'L2' toward an output side 'L1' in a direction of the motor shaft direction 'L'; wherein a cylinder-like cylindrical member 65 is placed at an outside in a radial direction of the first planetary gear unit 7, the second planetary gear unit 8, and the third planetary gear unit 9. In the first planetary gear unit 7, an internal gear 70 is formed at a section of a counter-output side 'L2', on an internal surface of the cylindrical member 65. Moreover, an internal gear 80 of the second planetary gear unit 8 is formed at a section of an output side 'L1', in relation to the internal gear 70, on the internal surface of the cylindrical member 65. Furthermore, an internal gear 90 of the third planetary gear unit 9 is formed at a section of an output side 'L1', in relation to the internal gear 80, on the internal surface of the cylindrical member 65.

As shown in FIG. 14, the cylindrical member 65 has an end plate part 66 at the output side 'L1'. At a center of the end plate part 66, a tubular part 661 protrudes toward the output side 'L1', and an inner side of the tubular part 661 is provided with a shaft hole 662 through which the output shaft 10 is inserted. Moreover, in the end plate part 66, there is formed a hole 663 that opens at a side surface section; wherein a screw 68 (refer to FIGS. 12A-12C) is placed into the hole 663 so as to set the case 2 and the cylindrical member 65 together. Furthermore, a engaging part 64 (refer to FIG. 14) protrudes toward a counter-output side 'L2' from an end part of the counter-output side 'L2' of the cylindrical member 65, so as to engage with the engaging convex part 552a (refer to FIG. 15B) of the bearing holder 55. In the meantime, a screw 69 (refer to FIG. 12A-12C) is placed into a hole 552c (refer to FIG. 14 and FIG. 15B) of the engaging convex part 552a so as to set together the case 2, the cylindrical member 65, and the bearing holder 55.

In the speed-reducer unit 6 configured as described above; at a time when the motor unit 5 operates to turn the motor shaft 59, a turning motion of the motor shaft 59 is speed-reduced at each step of the first planetary gear unit 7, the second planetary gear unit 8, and the third planetary gear unit 9, so as to be transmitted to the output shaft 10.

(Structure of the Brake Unit 4)

FIGS. 16 A-16C includes exploded perspective views of a brake unit 4 in the motor equipped with a brake 1, to which at least an embodiment of the present invention is applied; wherein FIG. 16A, FIG. 16B, and FIG. 16C are; an exploded perspective view observed from an output side 'L1', to show conditions under which a cylinder-like holder 49 (cylindrical holder) and the like are removed from the brake unit 4; an exploded perspective view observed from an output side 'L1', to show conditions under which each plate and the like are removed from the brake unit 4; and an exploded perspective view observed from a counter-output side 'L2', to show conditions under which each plate and the like are removed from the brake unit 4, respectively. FIGS. 17A-17B includes explanatory drawings of a turning prevention mechanism of the brake unit 4 in the motor equipped with a brake 1, to which at least an embodiment of the present invention is applied; wherein FIG. 17A and FIG. 17B are; a perspective view of the turning prevention mechanism observed from a counter-output side 'L2', and an exploded perspective view observed from a counter-output side 'L2', to show conditions under which the turning prevention mechanism is disassembled, respectively.

In the motor equipped with a brake 1 according to the present embodiment; being coaxial with the motor unit 5 and the speed-reducer unit 6, the brake unit 4 is configured at a counter-output side 'L2' of the motor unit 5. The brake unit 4 applies a braking force to the output shaft 10 by the intermediary of the motor shaft 59.

As shown in FIGS. 13A-13C, FIGS. 16A-16C, and FIGS. 17A-17B; the brake unit 4 includes; a disc-like first plate 41 that turns together with the motor shaft 59, a second plate 42 that faces the first plate 41 at a counter-output side 'L2' in the motor shaft direction 'L', a turning prevention mechanism 40 that prevents the second plate 42 from turning around a motor axis line 'L', and a plate drive mechanism 46 placed at a counter-output side 'L2' of the second plate 42 in the motor shaft direction 'L'. Furthermore, the brake unit 4 includes a receiver surface 437 that faces the first plate 41 at the other side (output side 'L1') against the second plate 42. In the present embodiment, the receiver surface 437 is configured with an end surface at a counter-output side 'L2' of a third plate 43 made of metal, wherein the end surface faces the first plate 41 at the other side (output side 'L1') against the second plate 42.

The second plate 42 and the third plate 43 are made of metal; and in the meantime, the first plate 41 is a friction plate made of a material softer than the second plate 42 and the third plate 43. Such a friction plate (i.e., the first plate 41) is manufactured, for example, in such a way that; a thermoplastic resin such as a phenol resin, an organic or inorganic fiber, a friction adjuster such as a ceramic, and powder of an antifriction material such as graphite are blended together, and then the blended material is shaped and thermally hardened.

In the first plate 41, there is formed a square shaft hole 410 at a center of the first plate 41; and in the meantime, a counter-output-end shaft part 59b of the motor shaft 59 is also shaped so as to be square. Therefore, if once the counter-output-end shaft part 59b of the motor shaft 59 is press-fitted into the square shaft hole 410 of the first plate 41, the first plate 41 and the motor shaft 59 are coupled so that the first plate 41 turns together with the motor shaft 59.

Moreover, the first plate 41 is provided with an annular first ring convex part 416 protruding from an outer rim of a first surface 411 (an end section of an outermost part in a radial direction) toward a counter-output side 'L2', at the first surface 411 of the counter-output side 'L2' facing the second plate 42. Furthermore, the first plate 41 is provided with an annular second ring convex part 417 protruding from an outer rim of a second surface 412 (an end section of an outermost part in a radial direction) toward an output side 'L1', at the second surface 412 of the output side 'L1' facing the third plate 43.

In the brake unit 4, there is placed the cylinder-like cylindrical holder 49 around the second plate 42; and inside the cylindrical holder 49, there are placed the first plate 41 and the plate drive mechanism 46, in addition to the second plate 42. The cylindrical holder 49 includes; a cylinder-like cylindrical part 491, a first plate part 492 stretching from the cylindrical part 491 toward a counter-output side 'L2', and a second plate part 493 stretching from the cylindrical part 491 toward a counter-output side 'L2' in such a way as to facing the first plate part 492. At an end part of a counter-output side 'L2' of each of the first plate part 492 and the second plate part 493, there are formed a hook 492a and a hook 493a for holding the board holder 31 shown in FIGS. 1A-1C.

At an end part of an output side 'L1' in the cylindrical part 491, there is formed a recessed part 495 in which a hole 495a is shaped. Then, under conditions where the disc part 541 of the bearing holder 54 is inserted inside the cylindrical part 491, a screw 499 shown in FIG. 12B is placed through the hole 495a and a hole 548 of the bearing holder 54 so as to connect the cylindrical holder 49 to the bearing holder 54. In the bearing holder 54, there is formed a rib-like convex part 544 protruding from an outer rim of the disc part 541 toward a counter-output side 'L2', and furthermore holes 545 are formed at a surface of a counter-output side 'L2' of the disc part 541.

The third plate 43 includes a circular ring part 431, and a plate-like convex part 432 protruding from an inner rim of the circular ring part 431 toward an output side 'L1', and the receiver surface 437 facing the second ring convex part 417 of the first plate 41 is configured with a surface of a counter-output side 'L2' of the circular ring part 431. In the present embodiment, an outer diameter of the circular ring part 431 of the third plate 43 is a little larger than an outer diameter of the first plate 41 (an outer diameter of the second ring convex part 417).

At a center of the plate-like convex part 432, there is formed a center hole 430 for the motor shaft 59 penetrating through; and meanwhile, in the plate-like convex part 432, there are formed holes 435 at three positions in a circumferential direction. Therefore, under conditions where the third plate 43 is stacked over a surface of a counter-output side 'L2' of the bearing holder 54; by way of placing screws (not shown) into the holes 435 and the holes 545, the third plate 43 is fixed to the bearing holder 54. As a result of that; the third plate 43 gets into a state of being fixed in a direction around the motor axis line 'L' as well as in the motor shaft direction 'L', so that the receiver surface 437 of the third plate 43 is under conditions of being fixed in the direction around the motor axis line 'L' as well as in the motor shaft direction 'L'.

The second plate 42 includes a circular plate part 421 having an outer diameter that is a little larger than the first plate 41, and a convex part 422 protruding from the circular plate part 421 toward a counter side (counter-output side 'L2') opposite to the first plate 41. In the present embodiment, the convex part 422 is composed of a cylindrical part protruding from a center of the plate part 421 toward the counter-output side 'L2'. In the present embodiment, the plate drive mechanism 46 is connected to the convex part 422 composed of the cylindrical part of the second plate 42; and between the convex part 422 and the cylindrical holder 49, there is configured the turning prevention mechanism 40 that prevents the second plate 42 from turning around the motor axis line 'L'.

More specifically to describe, the plate drive mechanism 46 includes a spring element 44 for biasing the second plate 42 toward the first plate 41, and a linear actuator 45 for interrupting the bias by the spring element 44. In the present embodiment, the spring element 44 is composed of a helical compression spring.

Being a solenoid actuator, the linear actuator 45 includes a linear-motion shaft 453 (solenoid plunger) composed of a shaft-like iron core, a cylindrical solenoid holder 515 (refer to FIG. 13B) surrounding the linear-motion shaft 453, and a solenoid coil 452 wound around the solenoid holder 451. Meanwhile, the linear actuator 45 has a solenoid base 47 for holding the solenoid holder 451. The solenoid base 47 includes a square bottom plate part 471 that holds an end part of a counter-output side 'L2' of the solenoid holder 451, a first side plate 472 stretching from one side of the bottom plate part 471 toward an output side 'L1', and a second side plate 473 stretching from the other side of the bottom plate part 471 toward an output side 'L1', in such a way as to face the first side plate 472. In the meantime, at an end of the first side plate 472 and the second side plate 473 at their output side 'L1', there is positioned an end plate 454 through which the linear-motion shaft 453 passes. While holes 474 are formed in the first side plate 472 and the second side plate 473, furthermore holes 494 are also formed in the cylindrical holder 49. Therefore, by way of placing screws (not shown) into the holes 474 and the holes 494, the solenoid base 47 and the cylindrical holder 49 can be fixed together. In the present embodiment, around a part of the linear-motion shaft 453, which protrudes from the end plate 454 toward an output side 'L1', there is provided the spring element 44 composed of a helical compression spring.

In the present embodiment, an end part of the linear-motion shaft 453 at its output side 'L1' is fitted inside the cylindrical convex part 422 of the second plate 42. Incidentally; in the convex part 422, there is formed a through hole 423 in a direction perpendicular to the motor axis line 'L'; and meanwhile in the end part of the linear-motion shaft 453 at its output side 'L1', there is also formed a through hole 453a in a direction perpendicular to the motor axis line 'L'. Then, in the present embodiment, a connection rod 48 is fitted through the hole 453a of the linear-motion shaft 453 and the hole 423 of the convex part 422, so that the linear-motion shaft 453 and the second plate 42 are connected with the connection rod 48. Accordingly, the second plate 42 can move together with the linear-motion shaft 453 in the motor shaft direction 'L'.

Two rod parts 481 protrude outward in a radial direction from the convex part 422, being cylindrical, of the second plate 42, by use of the connection rod 48, and a length of the spring element 44 in the motor shaft direction 'L' is restricted by the end plate 454 and the rod parts 481.

Furthermore, in the present embodiment; between the convex part 422 of the second plate 42 and the cylindrical holder 49, there is configured the turning prevention mechanism 40 that prevents the second plate 42 from turning around the motor axis line 'L'. More specifically to describe; as shown in FIGS. 17A-17B, in an internal surface of the cylindrical holder 49, there are formed a couple of grooves 496, into which the two rod parts 481 (both ends of the connection rod 48) are individually fitted; wherein the grooves 496 stretch in the motor shaft direction 'L'. Accordingly, although the second plate 42 can move in the motor shaft direction 'L' within a range where the grooves 496 are formed, it cannot turn around the motor axis line 'L'.

(Operation of the Brake Unit 4)

In the motor equipped with a brake 1 according to the present embodiment; while supply of electricity to the motor coils 513 of the motor unit 5 is interrupted, supply of electricity to the solenoid coil 452 is also interrupted. Therefore, the second plate 42 is biased toward the output side 'L1' by the spring element 44 in such a way as to contact the first ring convex part 416 of the first plate 41; and then under the condition, works to bias the first plate 41 toward the output side 'L1'. As a result of that, the second ring convex part 417 of the first plate 41 is pressed against the receiver surface 437 of the third plate 43. Accordingly, a frictional force between the first ring convex part 416 and the second plate 42 as well as a frictional force between the second ring convex part 417 and the third plate 43 work on the first plate 41, in such a way that a braking force is applied to the first plate 41 and the motor shaft 59.

Under the condition described above; if once electricity is supplied to the motor coils 513 of the motor unit 5, the solenoid coil 452 is also supplied with electricity. Therefore, acting against the spring element 44, the linear-motion shaft 453 moves toward a counter-output side 'L2' so that the second plate 42 also moves toward a counter-output side 'L2'. As a result of that, there comes up no frictional force between the first ring convex part 416 and the second plate 42, as well as between the second ring convex part 417 and the third plate 43, so that the first plate 41 and the motor shaft 59 turn around the motor axis line 'L'.

Under the condition described above; if supply of electricity to the motor coils 513 of the motor unit 5 gets interrupted again, supply of electricity to the solenoid coil 452 is also interrupted. Accordingly, a frictional force between the first ring convex part 416 and the second plate 42 as well as a frictional force between the second ring convex part 417 and the third plate 43 work on the first plate 41, in such a way that a braking force is applied to the first plate 41 and the motor shaft 59.

Primary Advantageous Effect of the Present Embodiment

As explained above, in the motor equipped with a brake 1 according to the present embodiment, the second plate 42 is activated by the plate drive mechanism 46, in order to have the first plate 41 (friction plate) and the second plate 42 contact with each other so as to generate a braking force. Meanwhile, for the second plate 42, there is configured the turning prevention mechanism 40 that prevents the second plate 42 from turning around the motor axis line 'L'; wherein the turning prevention mechanism 40 is configured between the convex part 422, protruding from the plate part 421 of the second plate 42 toward a counter side being opposite to the first plate 41, and the cylindrical holder 49. In other words, the turning prevention mechanism 40 is not configured by making use of an outer edge part in a radial direction of the second plate 42. Therefore, a braking force can be generated by way of having the first plate 41 and the second plate 42 contacted each other at an outer location placed as further as possible in a radial direction. Accordingly, a great braking force can be generated, without excessively enlarging an outer diameter of the first plate 41 and an outer diameter of the second plate 42.

In the meantime, the turning prevention mechanism 40 is configured with; the rod parts 481 protruding outward in a radial direction from the convex part 422 of the second plate 42, and the grooves 496 stretching along the motor shaft direction 'L' in the internal surface of the cylindrical holder 49; wherein the rod parts 481 are end parts of the connection rod 48 for connecting the convex part 422 of the second plate 42 and the linear-motion shaft 453 of the plate drive mechanism 46. Accordingly, the turning prevention mechanism 40 can be configured by making use of the connection rod 48 for connecting the second plate 42 and the linear-motion shaft 453, and therefore a structure of the brake unit 4 can be simplified.

Furthermore, the first plate 41 is a friction plate, and the outer diameter of the second plate 42 is larger than the outer diameter of the first plate 41. Therefore, at a time when the first plate 41 and the second plate 42 contact with each other by way of the plate drive mechanism 46, an end section of an outermost part in a radial direction of the first plate 41 and the second plate 42 contact with each other. Accordingly, between the first plate 41 and the second plate 42, a great braking force can be generated by making use of the outer diameter of the first plate 41, configured as the friction plate, at a maximum. Moreover, the first plate 41 is provided with the first ring convex part 416 at the end section of the outermost part in a radial direction of the first surface 411 that faces the second plate 42. Therefore, since the first ring convex part 416 (the end section of the outermost part in a radial direction) of the first plate 41 contacts the second plate 42 for sure, a great braking force can be generated between the first plate 41 and the second plate 42.

Moreover at a counter side being opposite to the second plate 42 with respect to the first plate 41; the receiver surface 437, which can neither move in the motor shaft direction 'L' nor turn around the motor axis line 'L', faces the first plate 41 in such a way that; at a time when the second plate 42 contacts the first plate 41, the receiver surface 437 contacts at least an outer part in a radial direction of the first plate 41. Therefore, a great braking force can also be generated between the first plate 41 (friction plate) and the receiver surface 437.

Moreover, an outer diameter of the receiver surface 437 is larger than the outer diameter of the first plate 41. Therefore, at a time when the first plate 41 and the second plate 42 contact with each other by means of the plate drive mechanism 46, the receiver surface 437 contacts at least the end section of the outermost part in a radial direction of the first plate 41. Accordingly, between the first plate 41 (friction plate) and the receiver surface 437, the great braking force can be obtained by making use of the outer diameter of the first plate 41, configured as the friction plate, at a maximum. Moreover, the first plate 41 is provided with the second ring convex part 417 protruding toward the receiver surface 437 at the end section of the outermost part in a radial direction of the second surface 412 that faces the receiver surface 437. Therefore, since the second ring convex part 417 (the end section of the outermost part in a radial direction) of the first plate 41 contacts the receiver surface 437 for sure, a great braking force can be generated between the first plate 41 and the receiver surface 437.

Another Embodiment

Although a configuration is made by using the first plate 41 as a friction plate in the embodiment described above, the configuration may be made by using the second plate 42 as a friction plate.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A tubular motor comprising:
   a tubular case that stretches in a motor shaft direction;
   a motor unit provided inside the case; and
   a first planetary gear unit placed inside the case at an output side in the motor shaft direction with respect to the motor unit;
   wherein, in the motor unit, a concave part, being recessed toward a counter-output side, is formed in an output side end surface of an output side end plate section that supports a rotor, in such a way as to be rotatable, at an output side of the rotor;
   in the first planetary gear unit, a planetary carrier comprises a supporting plate that overlaps with planetary gears at an counter-output side in order to support the planetary gears from the counter-output side; and
   the first planetary gear unit is immediately adjacent to the output side end plate section at an output side;
   wherein, the first planetary gear unit comprises a cylindrical member in which an internal gear is formed on an internal surface, and a counter-output side end section of the cylindrical member contacts the output side end plate section;
   wherein, the output side end plate section comprises an inner circumferential ring convex part protruding toward an output side from the output side end surface; and an outer circumferential ring convex part protruding toward an output side from the output side end surface, the outer circumferential ring convex part being positioned at an outer side of the inner circumferential ring convex part in a radial direction; and
   a space between the inner circumferential ring convex part and the outer circumferential ring convex part form the concave part;
   wherein, at the counter-output side end section of the cylindrical member, a step part is circularly formed, where an inner diameter of a section located at a counter-output side is larger than an inner diameter of a part having the internal gear formed there; and
   at the step part, a first part facing a counter-output side contacts the outer circumferential ring convex part from an output side; and at the step part, a second part facing inside in a radial direction contacts the outer circumferential ring convex part from an outside in a radial direction.

2. The tubular motor according to claim 1;
   wherein, inside the cylindrical member, a second planetary gear unit is placed at an output side of the first planetary gear unit; and
   in the second planetary gear unit, a planetary carrier comprises a supporting plate that overlaps with planetary gears at an counter-output side in order to support the planetary gears from a counter-output side.

3. The tubular motor according to claim 2;
   wherein, inside the cylindrical member, a third planetary gear unit is placed at an output side of the second planetary gear unit; and
   in the third planetary gear unit, a planetary carrier comprises a supporting plate that overlaps with planetary gears at an counter-output side in order to support the planetary gears from a counter-output side.

4. The tubular motor according to claim 3;
   wherein, all of an internal gear of the first planetary gear unit, an internal gear of the second planetary gear unit, and an internal gear of the third planetary gear unit are formed on the internal surface of the cylindrical member.

5. The tubular motor according to claim 4;
   wherein, inner diameters of the cylindrical member become larger step by step from an output side toward a counter-output side.

6. The tubular motor according to claim 1;
   wherein, a brake unit is provided inside the case, the brake unit being structured to apply a brake on the rotor of the motor unit at a position adjacent to a counter-output side of the motor unit.

7. A control method for a brushless motor including a rotor comprising a rotor magnet, a stator having a plurality of drive coils, and magnetic sensor elements for creating a position detecting signal corresponding to a turning motion of the rotor magnet; the control method comprising:
   carrying out a turning detection process in order to detect a turn of the rotor, on the basis of a detection result by the magnetic sensor elements, before starting to supply the drive coils with electricity, in a first direction driving process for driving the rotor to turn in a first direction, wherein a load for turning in the first direction being externally applied to the rotor;

supplying the plurality of drive coils with a drive current for driving the rotor to turn in the first direction, in the case where a turning speed of the rotor is less than a threshold, according to a detection result of the turning detection process; and applying a braking force to the rotor, in the case where the turning speed of the rotor is equal to or higher than the threshold;

wherein, the braking force is generated by way of short-circuiting both terminals of at least one drive coil out of the plurality of drive coils.

8. The control method for a brushless motor according to claim 7 wherein, at a time of applying the braking force to the rotor, a comparison is made between a commanded speed for driving the rotor to turn in the first direction, and a turning speed of the rotor detected by the magnetic sensor elements, in order to change a level of the braking force, on the basis of a comparison result between the commanded speed and the turning speed.

9. The control method for a brushless motor according to claim 7;

wherein, in a second direction driving process for driving the rotor to turn in a second direction, being opposite to the first direction, without the turning detection process, the plurality of drive coils are supplied with a drive current for driving the rotor to turn in the second direction.

10. The control method for a brushless motor according to claim 7;

wherein, after supplying the plurality of drive coils with the drive current, a turn of the rotor is detected on the basis of the detection result by the magnetic sensor elements; and if the turning speed of the rotor is lower than a specified speed value, the drive current is increased; and in the meantime, if the turning speed of the rotor is lower than a specified speed value, the drive current is decreased.

11. The control method for a brushless motor according to claim 7;

wherein, the rotor is connected to a turning shaft for winding a shutter, by the intermediary of a series of speed-reduction gears.

12. A motor equipped with a brake comprising:

a motor unit comprising a motor shaft that is rotatable around an axis line; and a brake unit structured to apply a braking force to the motor shaft;

wherein, the brake unit comprises:

a disc-like first plate that turns together with the motor shaft;

a second plate that faces the first plate in a shaft direction;

a cylindrical holder placed around the second plate;

a turning prevention mechanism structured to prevent the second plate from turning around the axis line; and a plate drive mechanism structured to drive the second plate to one direction for making the first plate and the second plate contact with each other as well as to the other direction for making the first plate and the second plate draw apart from each other; and the second plate comprises: a plate part that faces the first plate, and a convex part that protrudes from the plate part toward a counter side being opposite to the first plate; and the turning prevention mechanism is structure to prevent the second plate from turning, between the convex part and the cylindrical holder; and at a time when the plate drive mechanism has the first plate and the second plate contact with each other, the first plate and the second plate contact with each other at least at an outer part in a radial direction, in such a way as to generate the braking force.

13. The motor equipped with a brake according to claim 12;

wherein, the turning prevention mechanism comprises:

rod parts protruding outward in a radial direction from the convex part, and grooves stretching along the shaft direction in an internal surface of the cylindrical holder; where ends of the rod parts at an outside in the radial direction being fitted into the grooves.

14. The motor equipped with a brake according to claim 13;

wherein, the rod parts are materialized with ends of a connection rod that connects the convex part and a linear-motion shaft of the plate drive mechanism.

15. The motor equipped with a brake according to claim 12;

wherein, the first plate is a friction plate;

an outer diameter of the second plate is larger than an outer diameter of the first plate; and at a time when the first plate and the second plate contact with each other by means of the plate drive mechanism, at least an end section of an outermost part in a radial direction of the first plate and the second plate contact with each other in such a way as to generate the braking force.

16. The motor equipped with a brake according to claim 15;

wherein, the first plate comprises a first ring convex part at the end section of the outermost part in a radial direction of a surface that faces the second plate, where the first ring convex part protruding toward the second plate.

17. The motor equipped with a brake according to claim 15;

wherein, the motor comprises a receiver surface that faces the first plate at a counter side being opposite to the second plate, where the receiver surface being unable to move in the shaft direction nor turn around the axis line; and at a time when the second plate contacts the first plate, the receiver surface contacts at least an outer part in a radial direction of the first plate.

18. The motor equipped with a brake according to claim 17;

wherein, an outer diameter of the receiver surface is larger than the outer diameter of the first plate; and at a time when the first plate and the second plate contact with each other by means of the plate drive mechanism, the receiver surface contacts at least the end section of the outermost part in a radial direction of the first plate.

19. The motor equipped with a brake according to claim 18;

wherein, the first plate comprises a second ring convex part protruding toward the receiver surface at an end section of an outermost part in a radial direction of a surface that faces the receiver surface.

20. The motor equipped with a brake according to claim 17;
wherein, the receiver surface is a surface of the third plate, at a side facing the first plate, where the third plate being fixed to a bearing holder that holds a radial bearing unit for the motor shaft.

21. The motor equipped with a brake according to claim 12;
wherein, the plate drive mechanism comprises a spring element for biasing the second plate toward the first plate, and a linear actuator for interrupting the biasing motion by the spring element.

22. The motor equipped with a brake according to claim 21;
wherein, the linear actuator is a solenoid actuator.

23. The motor equipped with a brake according to claim 12;
wherein, the motor comprises a speed-reducer section for speed-reducing a turning motion of the motor shaft and transmitting the turning motion slowed down to an output member, where the speed-reducer section being located at a counter side being opposite to the brake unit with respect to the motor unit.

* * * * *